(12) United States Patent
Kohno et al.

(10) Patent No.: US 8,848,924 B2
(45) Date of Patent: Sep. 30, 2014

(54) PRIVACY-PRESERVING LOCATION TRACKING FOR DEVICES

(75) Inventors: Tadayoshi Kohno, Seattle, WA (US); Arvind Krishnamurthy, Seattle, WA (US); Gabriel Maganis, Shoreline, WA (US); Thomas Ristenpart, La Jolla, CA (US)

(73) Assignee: University of Washington, Seattle, WA (US)

( * ) Notice: Subject to any disclaimer, the term of this patent is extended or adjusted under 35 U.S.C. 154(b) by 984 days.

(21) Appl. No.: 12/276,829

(22) Filed: Nov. 24, 2008

(65) Prior Publication Data

US 2009/0323972 A1    Dec. 31, 2009

Related U.S. Application Data

(60) Provisional application No. 61/076,422, filed on Jun. 27, 2008.

(51) Int. Cl.
*H04L 9/08* (2006.01)
*H04L 9/30* (2006.01)
*G06F 17/30* (2006.01)

(52) U.S. Cl.
CPC ............... *H04L 9/08* (2013.01); *H04L 9/0883* (2013.01); *H04L 9/30* (2013.01); *G06F 17/30097* (2013.01); *G06F 17/30613* (2013.01); *G06F 17/30312* (2013.01); *G06F 17/30619* (2013.01); *G06F 17/3087* (2013.01)
USPC ....................................................... 380/284

(58) Field of Classification Search
CPC ............................ H04L 9/08; G06F 17/30097
USPC ........................................................ 380/284
See application file for complete search history.

(56) References Cited

U.S. PATENT DOCUMENTS

| | | | |
|---|---|---|---|
| 5,715,174 A | 2/1998 | Cotichini et al. | 709/229 |
| 5,764,892 A | 6/1998 | Cain et al. | 709/200 |
| 5,802,280 A | 9/1998 | Cotichini et al. | 709/200 |
| 5,802,590 A * | 9/1998 | Draves | 711/164 |
| 5,896,497 A | 4/1999 | Halstead | 726/35 |
| 6,150,921 A * | 11/2000 | Werb et al. | 340/10.1 |

(Continued)

OTHER PUBLICATIONS

Bellare et al., "Forward-Security in Private-Key Cryptography", 2000.*

(Continued)

*Primary Examiner* — Ondrej Vostal
(74) *Attorney, Agent, or Firm* — Christensen O'Connor Johnson Kindness PLLC

(57) ABSTRACT

A privacy-preserving device-tracking system and method to assist in the recovery of lost or stolen Internet-connected mobile devices. The function of such a system seem contradictory, since it is desirable to hide a device's legitimately-visited locations from third-party services and other parties to achieve location privacy, while still enabling recovery of the device's location(s) after it goes missing by tracking the device to determine its location. An exemplary embodiment uses a DHT for storing encrypted location information and other forensic information in connection with indices that are successively determined based on initial pseudorandom seed information (i.e., state) that is retained by the owner of the device. Using the seed information, the software can determine indices mapped to location information stored after the device went missing, enabling the device to be located. Numerous extensions are discussed for the basic exemplary design that increase its suitability for particular deployment environments.

49 Claims, 6 Drawing Sheets

(56) References Cited

U.S. PATENT DOCUMENTS

| | | | |
|---|---|---|---|
| 6,244,758 B1 | 6/2001 | Solymar et al. | 709/224 |
| 6,269,392 B1 | 7/2001 | Cotichini et al. | 709/200 |
| 6,300,863 B1 | 10/2001 | Cotichini et al. | 340/5.8 |
| 6,507,914 B1 | 1/2003 | Cain et al. | 726/35 |
| 6,970,183 B1* | 11/2005 | Monroe | 348/143 |
| 7,009,510 B1* | 3/2006 | Douglass et al. | 340/531 |
| 7,336,174 B1* | 2/2008 | Maloney | 340/572.1 |
| 7,469,139 B2* | 12/2008 | van de Groenendaal | 455/411 |
| 7,603,710 B2* | 10/2009 | Harvey et al. | 726/23 |
| 7,689,493 B1* | 3/2010 | Sullivan et al. | 705/36 R |
| 7,979,439 B1* | 7/2011 | Nordstrom et al. | 707/741 |
| 2002/0114453 A1* | 8/2002 | Bartholet et al. | 380/44 |
| 2003/0014666 A1* | 1/2003 | O'Keefe | 713/201 |
| 2003/0084035 A1* | 5/2003 | Emerick, III | 707/3 |
| 2003/0126291 A1* | 7/2003 | Wang et al. | 709/245 |
| 2003/0131233 A1* | 7/2003 | Garstin et al. | 713/160 |
| 2004/0025057 A1* | 2/2004 | Cook | 713/201 |
| 2004/0088548 A1* | 5/2004 | Smetters et al. | 713/175 |
| 2004/0101142 A1* | 5/2004 | Nasypny | 380/278 |
| 2005/0004830 A1* | 1/2005 | Rozell et al. | 705/10 |
| 2005/0094640 A1* | 5/2005 | Howe | 370/395.1 |
| 2005/0114610 A1* | 5/2005 | Robinson et al. | 711/152 |
| 2005/0152305 A1* | 7/2005 | Ji et al. | 370/328 |
| 2005/0216757 A1 | 9/2005 | Gardner | 713/194 |
| 2006/0022809 A1* | 2/2006 | Lessard et al. | 340/426.1 |
| 2006/0062391 A1* | 3/2006 | Lee et al. | 380/270 |
| 2006/0133614 A1* | 6/2006 | Zhang et al. | 380/273 |
| 2006/0272020 A1 | 11/2006 | Gardner | 726/23 |
| 2006/0282660 A1* | 12/2006 | Varghese et al. | 713/155 |
| 2007/0055870 A1* | 3/2007 | Bruti et al. | 713/168 |
| 2007/0115982 A1* | 5/2007 | Pope et al. | 370/392 |
| 2007/0130070 A1* | 6/2007 | Williams | 705/50 |
| 2007/0206749 A1* | 9/2007 | Pincu et al. | 379/142.1 |
| 2007/0211891 A1* | 9/2007 | Shamoon et al. | 380/28 |
| 2007/0234427 A1 | 10/2007 | Gardner et al. | 726/23 |
| 2007/0256117 A1* | 11/2007 | Shomo | 726/2 |
| 2008/0042830 A1* | 2/2008 | Chakraborty et al. | 340/540 |
| 2008/0049740 A1* | 2/2008 | Serceki et al. | 370/386 |
| 2008/0092168 A1* | 4/2008 | Logan et al. | 725/44 |
| 2008/0104046 A1* | 5/2008 | Singla et al. | 707/4 |
| 2008/0130899 A1* | 6/2008 | Iwamoto et al. | 380/278 |
| 2008/0243788 A1* | 10/2008 | Reztlaff et al. | 707/3 |
| 2008/0244276 A1* | 10/2008 | Prouff et al. | 713/193 |
| 2008/0294384 A1* | 11/2008 | Fok et al. | 702/187 |
| 2008/0294674 A1* | 11/2008 | Reztlaff et al. | 707/102 |
| 2009/0005987 A1* | 1/2009 | Vengroff et al. | 701/300 |
| 2009/0043681 A1* | 2/2009 | Shoji et al. | 705/35 |
| 2009/0063399 A1* | 3/2009 | Aboulnaga et al. | 707/2 |
| 2009/0086976 A1* | 4/2009 | Scian | 380/277 |
| 2009/0178031 A1* | 7/2009 | Zhao | 717/143 |
| 2009/0276829 A1* | 11/2009 | Sela et al. | 726/2 |
| 2009/0316886 A1* | 12/2009 | Camenisch et al. | 380/44 |
| 2009/0319550 A1* | 12/2009 | Shau et al. | 707/101 |
| 2010/0022221 A1* | 1/2010 | Yi et al. | 455/414.1 |
| 2010/0023726 A1* | 1/2010 | Aviles | 711/216 |

OTHER PUBLICATIONS

Ristenpart et al., "Privacy-Preserving Location Tracking of Lost or Stolen Devices: Cryptographic Techniques and Replacing Trusted Third Parties with DTs", Jul. 2008.*

Blum et al., "How to Generate Cyrptographically Strong Sequences of Pseudo Random Bits", 1982.*

Lu et al., "Towards Plugging Privacy Leaks in Domain Name System".*

Canetti et al., "A Forward-Secure Public-Key Encryption Scheme", May 2003.*

Wolchok et al., "Defeating Vanish with Low-Cost Sybil Attacks Against Large DHTs".*

Boyen et al., "Forward-Secure Signatures with Untrusted Update", Oct. 2006.*

Williams, "Providing for Wireless LAN Security, Part 2", 2002.*

Lu et al., "Towards Plugging Privacy Leaks in Domain Name System", 2009.*

Wolchok et al., "Defeating Vanish with Low-Cost Sybil Attacks Against Large DHTs", 2009.*

\* cited by examiner

12 — From: tech@brigadoonsoftware.com
To: tech@brigadoonsoftware.com
BCC: tomrist@gmail.com
Subject: Information
PCPH Pro For Win 95/98/ME/NT/2K/XP – Version 3.0 (Eval)
Date: 16-08-2007
Time: 11:14:05
Computer Name: TOM-8F760D01401
User Name: LOCAL SERVICE
IPAddress:0.0.0.0
18a — IPAddress:128.208.7.80

18b — Mac Address: 00-18-8B-A2-05-E5
Mac Address: 00-18-DE-9B-F0-5A
Serial Number: DC44BF26
Registrants Name: Tom
Organization: Tom
14 — Address: 513 Brooklyn Avenue
City: Seattle
State/Province: WA
Zip/ostal Code: 98105
Country: USA
16 — Work Phone: 2066163997

| User | # Inserts | Insert Rate | # Updates | Update Rate | Locations Found | Retrieve Time |
|---|---|---|---|---|---|---|
| 01 | 491 | 0.89 | 251 | 0.94 | 11/12 | 12m 06s |
| 02 | 632 | 0.89 | 327 | 0.94 | 3/3 | 16m 04s |
| 03 | 622 | 0.84 | 321 | 0.91 | 2/2 | 17m 04s |
| 04 | 543 | 0.87 | 274 | 0.95 | 5/5 | 15m 03s |
| 05 | 617 | 0.88 | 309 | 0.96 | 4/4 | 19m 04s |
| 06 | 234 | 0.85 | 123 | 0.90 | 4/4 | 15m 06s |
| 07 | 359 | 0.89 | 199 | 0.95 | 5/6 | 18m 04s |
| 08 | 420 | 0.85 | 220 | 0.92 | 7/7 | 14m 06s |
| 09 | 504 | 0.91 | 259 | 0.97 | 1/1 | 11m 06s |
| 10 | 138 | 0.90 | 59 | 0.92 | 4/4 | 13m 04s |
| 11 | 302 | 0.81 | 175 | 0.91 | 6/6 | 14m 04s |

PRIVACY-PRESERVING LOCATION TRACKING FOR DEVICES

GOVERNMENT RIGHTS

This invention was made with government support under CNS-0627157, CNS-0722000, CNS-0619836, and CNS-0631587 awarded by the National Science Foundation. The government has certain rights in the invention.

RELATED APPLICATIONS

This application is based on a prior copending provisional application, Ser. No. 61/076,422, filed on Jun. 27, 2008, the benefit of the filing date of which is hereby claimed under 35 U.S.C. §119(e).

BACKGROUND

The growing ubiquity of mobile computing devices, and reliance upon them, means that losing them is simultaneously more likely and more damaging. For example, the annual CSI/FBI Computer Crime and Security Survey ranks laptop and mobile device theft as a prevalent and expensive problem for corporations. To help combat this growing problem, corporations and individuals are deploying commercial device-tracking software, for example, "LoJack for Laptops" on their mobile devices. These systems typically send the identity of the device and its current network location (e.g., its IP address) over the Internet to a central server run by the device-tracking service. After losing a device, the service can determine the location of the device and, subsequently, can work with the owner and legal authorities to recover the device itself The number of companies offering such services attests to the large and growing market for device tracking.

Unfortunately, these systems are incompatible with the oft-cited goal of location privacy, since the device-tracking services can always monitor the location of an Internet-enabled device—even while the device is in its owner's possession. This presents a significant barrier to the psychological acceptability of tracking services. To paraphrase one industry representative: companies will deploy these systems in order to track their devices, but they won't like it. The current situation leaves users of mobile devices in the awkward position of either using tracking services or protecting their location privacy.

An alternative is offered known as privacy-preserving device-tracking systems. Such a system should provide strong guarantees of location privacy for the device owner's legitimately visited locations while nevertheless enabling tracking of the device after it goes missing. It should do so even while relying on untrusted third party services to store tracking updates. It would also be desirable to log forensic information, while preserving privacy. As used herein, the term "forensic information" can refer to any information that can be useful in a legal action, such as prosecuting a person who is accused of stealing an electronic device, or for gathering evidence. For example, forensic information might include tracking information showing where an electronic device has been moved after it was stolen, or photos, video, audio, and other types of sensor data that were logged after the device was stolen. It would be desirable to provide such forensic information to assist in locating a stolen device, since photos or videos of a person or even of an environment proximate to a stolen device could be useful in determining where the device is located and for establishing the identity of the person or persons in the proximity of the device after it has gone missing.

SUMMARY

For addressing the problems noted above, an exemplary system has been developed for storing a plurality of information data files on a remote storage in association with a corresponding plurality of different indices. Each information data file includes location information that is indicative of a location of an electronic device. The system includes a location module that is executed on the electronic device and determines the location information. A core module is also executed on the electronic device and determines a plurality of different states for the core module over time. Each state is determined by the core module as a function of a previous state and is used by the core module to determine an index that will be associated with a current information data file when the current information data file is uploaded and stored on the remote storage. The core module thereby stores a succession of indices and corresponding information data files on the remote storage over time. A retrieval module is also provided and will typically be executed on a different device. The retrieval module uses an initial state for the core module to determine the plurality of different states. Thus, an index that was associated with a desired information data file when the desired information data file was stored on the remote storage can be determined by the retrieval module. This functionality enables the desired information data file to be retrieved from the remote storage, in order to access the location information included therein. The location information is indicative of the location of the electronic device and can be used to locate the electronic device, e.g., after it has been lost or stolen.

The core module employs the plurality of different states to generate a succession of cryptographic keys. Each cryptographic key that is thus generated is used by the core module to cryptographically protect a different one of the information data files stored on the remote storage. The retrieval module also uses the plurality of different states determined as a function of the initial state to determine the cryptographic key that was used to cryptographically protect the desired information data file, enabling the location information included in the desired information data file to be accessed. The cryptographic key cryptographically protects the information data file by carrying out at least one of two functions, including encrypting the information data files, so as to maintain the location information included therein private; and, authenticating the location information included in the information data files, to ensure that the location information was actually determined by the location module and stored on the remote storage by the core module that is executed by the electronic device.

If the core module detects an event, it can respond by storing the current information data file on the remote storage. For example, if the electronic device is being used by a different person than has previously used the electronic device, the core module can detect such use by detecting that data entry dynamics are different for a current user of the electronic device than for a person previously using the electronic device, or by determining that the appearance (e.g., determined using face recognition software) of the current user is different than that of the person who previously used the electronic device.

The core module also can further use the plurality of different states to determine a succession of pseudorandom intervals between times at which the information data files and indices associated with the information data files are stored on the remote storage. The retrieval module similarly determines each of the successive pseudorandom intervals between times at which the information data files were stored on the remote storage, to determine the index associated with the desired information data file as a function of the state at the time that said file was stored on the remote storage.

The system can further include a cache for storing location information on the electronic device between times that the information data files are stored on the remote storage. The location information that is included in the cache can include other forensic data and can include information that has previously been stored on the remote storage, e.g., to provide more redundancy in the location information that is subsequently retrievable from the remote storage and to store information collected between updates to the remote storage. In this case, the core module uses the plurality of states to determine cache states. The cache states are used to generate a succession of cryptographic cache keys for encrypting the location information temporarily stored in the cache. A new cache state is determined based on the current state each time that a information data file is stored on the remote storage. Until the next state is determined, each new cache state is determined based on a previous cache state. The cache states are used to generate new cache cryptographic keys. A new cache cryptographic key is thus generated and used for encrypting each new location information temporarily stored in the cache. All of the cryptographically protected location information temporarily stored in the cache is further cryptographically protected with a current cryptographic key before being stored on the remote storage.

Based on the initial state, the retrieval module also determines the cryptographic cache states and cache cryptographic keys, to enable access of desired location information that was cryptographically protected for temporary storage in the cache before the information was stored on the remote storage, in the desired information data file.

The core module uses a forward-secure generator to generate cryptographic keys, beginning with the initial state and using the plurality of different states. Each of the succession of cryptographic keys is generated as a function of a different state in the plurality of states so as to prevent a current state from being used to determine any previous state, or a current cryptographic key from being used to determine any previous cryptographic key.

The location information determined by the location module includes at least one of a network address of the electronic device, a traceroute of a communication path between the electronic device and other devices, geolocation information based on roundtrip times for a signal conveyed between the electronic device and a plurality of other devices disposed at different known locations, a location determined using global positioning satellites, a location inferred from wireless signals, like the transmitted SSIDs of nearby wireless access points, and physical forensic information about the contents of the electronic device, including photos and videos of the surrounding environment, which may include a photo or video of the thief who has stolen the electronic device and may show the background location where the electronic device is being used after it was lost or stolen, as well as accelerometer readings (e.g., for use in inertial tracking of the electronic device), audio recordings of sound detected proximate to the electronic device, and other sensor data that may indicate where the device is located or who is using it after it has gone missing or been stolen. Police can use the identity of the thief to then determine an address for the thief where the electronic device can be found and recovered. The forensic information can be used to identify a thief or to identify a location where the electronic device is being used. Further, the forensic information can be used in legal prosecution of a person for theft of the electronic device. To enable collection of image or video forensic information, the system can include an imaging device.

The remote storage can comprise a distributed hash table for storing the cryptographically protected information data files in association with their corresponding indices.

The core module can digitally sign each information data file that is uploaded for storage with a private key that is assigned by one or more trusted third parties as part of an anonymous group signature scheme. Then, the remote storage can verify that each information data file uploaded by the core module is digitally signed by the private key that is part of the anonymous group signature scheme, before storing the information data file. If the information data file is not properly digitally signed, it will not be stored on the remote storage. Further, if the private key is compromised, it can be removed from the group signature scheme, preventing it from being successfully employed to verify the authenticity of any uploaded information data file.

As a further option, the retrieval module can determine a set of storage indices that will be used by the electronic device and then, can upload one or more software commands to the indices on the remote storage. When the core module on the electronic device stores a current information data file on the remote storage to those indices, the core module will then detect the one or more commands stored there and will download the one or more commands, so that they can be executed on the electronic device. These commands can be encrypted, and/or digitally signed by the retrieval module. The core module will then decrypt the commands (if they were encrypted), and will verify their authenticity, if they were digitally signed.

Instead of using a symmetric key for both encrypting and decrypting the information data files, the core module can encrypt the information data files before uploading them for storage on the remote storage using a public key. In this case, the retrieval module will be provided with a corresponding private key by an authorized party for use in decrypting the information data files after downloading them from the remote storage, so that the information included therein can be accessed.

Other aspects of the present innovative technology are directed to a computer-readable memory medium on which are stored machine instructions for carrying out a plurality of functions to store a plurality of information data files on a remote storage in association with a corresponding plurality of different indices, each information data file including location information that is indicative of a location of an electronic device. Yet another aspect of the technology is directed to a method for tracking an electronic device to enable it to be located if it is lost or stolen. In each of these other aspects, functions similar to those described above in connection with the system components are implemented. Still another aspect is directed to apparatus for storing location information for the apparatus on a remote storage in connection with a succession of indices, each index in the succession of indices being associated with a different information data file. The apparatus includes a memory in which are stored machine executable instructions, a network interface for communicating over a network, and a processor in communication with memory and the network interface. The processor executes the machine executable instructions to carry out a plurality of functions that are generally like those implemented by the core module and the location module, as discussed above.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIG. 1 (prior art) illustrates an example of a tracking email that is sent unencrypted by a conventional tracking software program, from a laptop computer;

Figure 7:
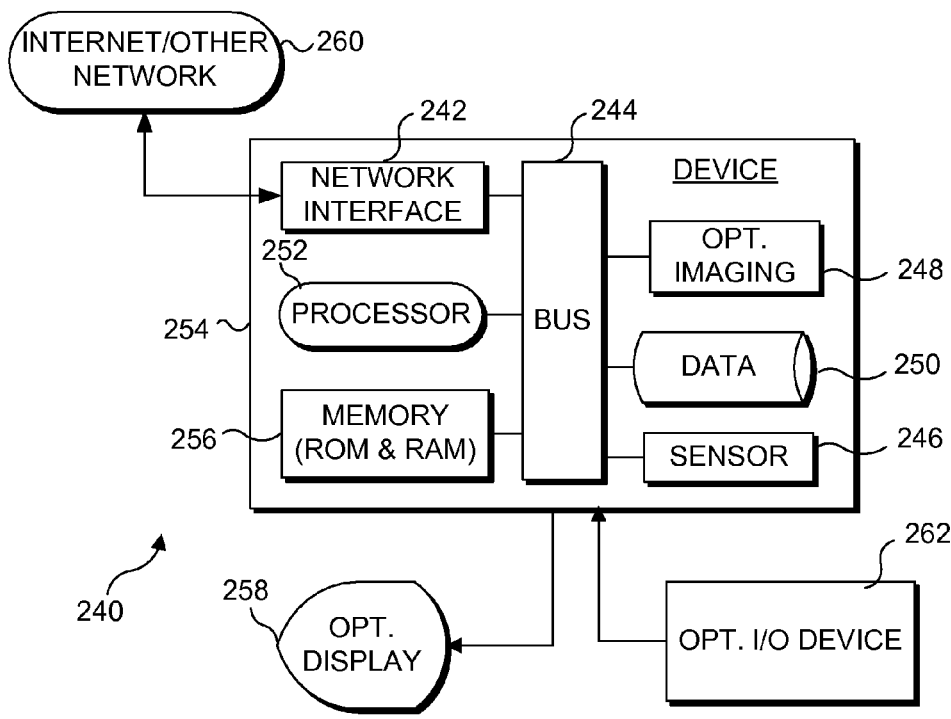
Figure 6:
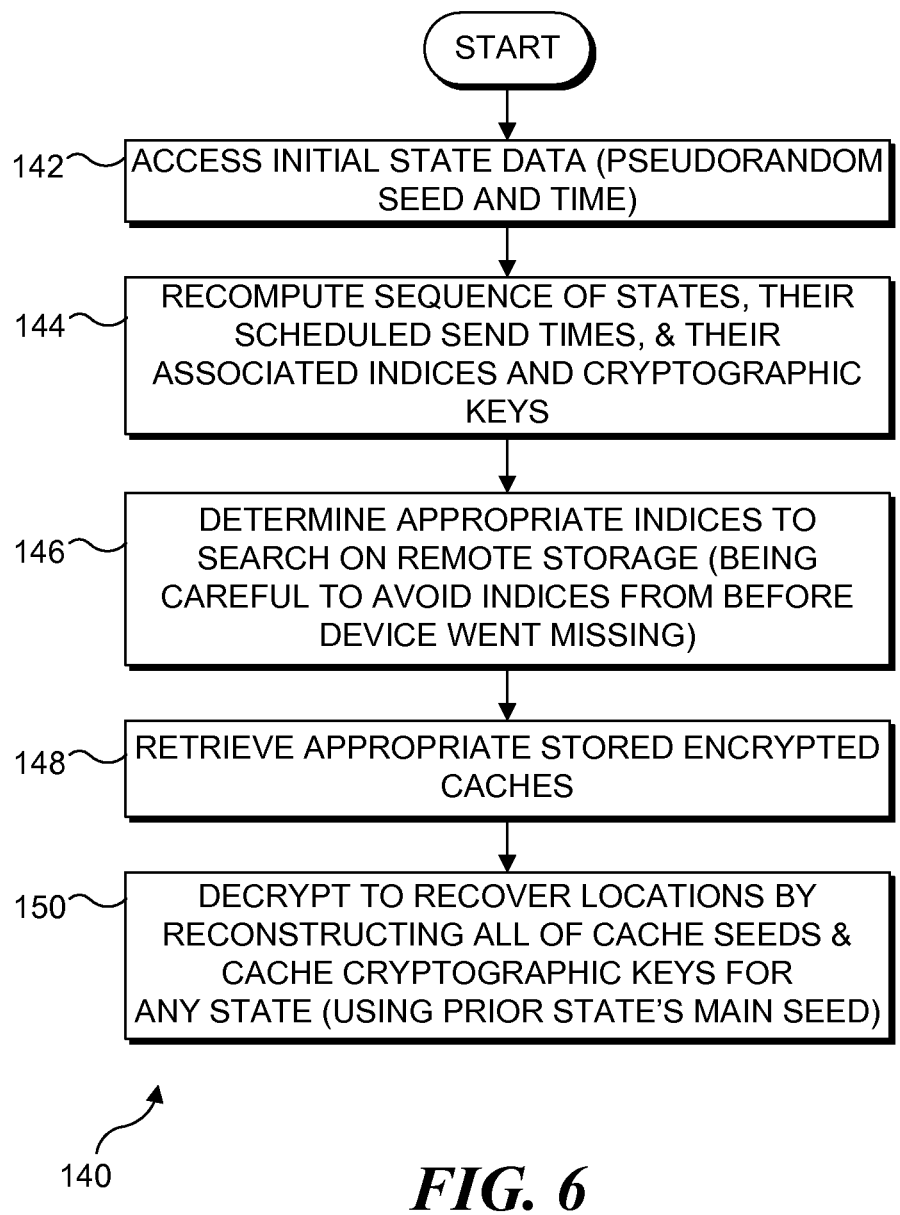

FIG. 6 is a flow chart illustrating exemplary logical steps that are implemented to retrieve location information from the remote storage for a time after an electronic device has been lost or stolen, to provide information that may be useful in locating the electronic device; and FIG. 7 is a schematic block diagram of a logic device that might be the electronic device monitored in accord with the present approach, or alternatively, can be a personal computer that can be used to retrieve the location information for the electronic device that has been tracked.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

The Utility of Device Tracking Systems

Before diving into technical details, it is necessary to first step back to reevaluate whether device tracking, let alone privacy-preserving device tracking, even makes sense as a legitimate security tool for mobile device users. A motivated and sufficiently equipped or knowledgeable thief (i.e., the malicious entity in possession of a missing device) can always prevent Internet device tracking, for example, by erasing software on the device, preventing the device from connecting to the Internet, or even destroying the device to recover parts. One might even be tempted to conclude that the conventional products currently available for device tracking are simply ineffective and not worth the time to install and use.

However, this extreme view of device security is inappropriate for device tracking. While device tracking will not always work, such systems can work, and vendors (perhaps, with some bias) claim high recovery rates. The typical thief of an electronic device is, after all, often opportunistic and unsophisticated, and it is against such thieves that tracking systems can clearly provide significant value and offer at least some chance of recovering the stolen device. The novel approach disclosed below aims to retain this value while simultaneously addressing the considerable threats to user location privacy.

System Goals

As an overview, an exemplary device tracking system includes: client hardware or software logic installed on a device; (optionally) cryptographic key material stored on the device; (optionally) cryptographic key material maintained separately by the device owner; and, a remote storage. The client sends location updates over the Internet to the remote storage. Once a device goes missing, the owner or authorized agent searches the remote storage for location updates pertaining to the device's current whereabouts using a retrieval device, such as another computer.

To understand the goals of a privacy-preserving tracking system, it is necessary to begin with an exploration of existing (prior art) or hypothetical tracking systems in scenarios that are derived from real situations that are described below. This approach reveals a restrictive set of deployment constraints (e.g., supporting both efficient hardware and software clients) and an intricate threat model for location privacy where the remote storage provider is untrusted, the thief may try to learn past locations of the device, and other outsiders might attempt to glean private data from the system or "piggy-back" on it to easily track a device. The following main system goals have been developed:

(1) Updates sent by the client must be anonymous and unlinkable, which means that no adversary should be able to conclusively either associate an update to a particular device, or even associate two updates to the same (unknown) device.

(2) The tracking client must ensure forward-privacy, meaning a thief, even after seeing all of the internal state of the client, cannot learn past locations of the device.

(3) The client should protect against timing attacks by ensuring that the regular periodicity of updates cannot be easily used to identify a device.

(4) The owner should be able to efficiently search the remote storage in a privacy-preserving manner that does not identify the owner or the electronic device.

(5) The system must match closely the efficiency, deployability, and functionality of existing solutions that have little or no privacy guarantees.

These goals are not satisfied by straightforward or existing solutions. For example, simply encrypting location updates before sending to the remote storage does not enable efficient retrieval. As another example, mechanisms for generating secure audit logs, while seemingly applicable, in fact violate anonymity and unlinkability requirements by design.

It is emphasized that one non-goal of the system is improved device tracking. As discussed above, all tracking systems in this category have fundamental limitations. Indeed, the overarching goal is to show that, in any setting where deploying a device tracking system makes sense, one can do so effectively without compromising privacy.

Further Details of the System

An exemplary embodiment of the system meets the aggressive goals outlined above. A client portion of the system includes two modules: a location-finding module, and a cryptographic core. With a small amount of state, the cryptographic core uses a forward-secure pseudorandom generator (FSPRG) to efficiently and deterministically encapsulate updates, rendering them anonymous and unlinkable, while also scheduling them to be sent to the remote storage at pseudo-randomly determined times (to help mitigate timing attacks). The cryptographic core ensures forward-privacy, since a thief, after determining all of the internal state of the client and even with access to all data on the remote storage, cannot use the system to reveal past locations of the device. The owner of the device, with a copy of the initial state of the client, can efficiently search the remote storage for the updates of location that were stored after the device was lost or stolen. The cryptographic core uses only a sparing number of calls to the advanced encryption standard (AES) per update of the device location on the remote storage.

The cryptographic techniques used in the cryptographic core have wide applicability, straightforwardly composing with any location-finding technique or remote storage instantiation that may be adopted. This broad applicability is showcased in this exemplary embodiment by implementing the technology as a fully functional tracking system using a public distributed storage infrastructure, OpenDHT™ (i.e., Open Distributed Hash Table). Potentially, other distributed hash table infrastructures such as the Vuze BitTorrent™ DHT could have been used. Using a Distributed Hash Table (DHT) for remote storage means that there is no single trusted infrastructural component, and that deployment can proceed immediately in a community-based way. End users need simply install a software client on the device to be protected to enable the private device tracking service. The system provides the first device tracking system not tied to a particular service provider, and a host is not used to handle the storage of location files. Moreover, this is the first exploration of replacing a centralized trusted third-party service (or host system) with a decentralized DHT that is simply used as a remote storage for location information for the devices.

Extensions

The present approach makes slight trade-offs between simplicity, privacy, and device tracking. These trade-offs are addressed with several extensions to the basic system. The extensions serve two purposes: (1) they highlight the versatility of the basic privacy-enhancing techniques; and, (2) they can be used to better protect the tracking client against technically sophisticated thieves (at the cost of slight increases in complexity). In particular, several additions to the basic functionality of the novel technology are discussed below. For example, a novel cryptographic primitive, a tamper-evident FSPRG, has been designed to enable detection of adversarial modifications to the client device's state.

Implementation and Field Testing

The present novel system and some of its extensions have initially been implemented as user applications for Linux and the Apple Mac OS X™ operating systems, but more recently, software has been released that is designed to run on Microsoft Corporation's Windows XP™, and Vista™ operating systems. Moreover, a short trial was conducted in which the present system was deployed on real users' systems, including a number of laptops. This experience suggests that the present system provides an immediate solution for privacy-preserving device tracking.

Problem Formulation

To explore existing and potential tracking system designs and understand the variety of adversarial threats, a sequence of hypothetical tracking scenarios was studied. While fictional, the scenarios are based on real stories and products. These scenarios reveal issues that affect goals and designs for private device tracking.

Scenario 1

Vance, an avid consumer of mobile devices, recently heard about the idea of "LoJack for Laptops." He searches the Internet, finds the EmailMe device tracking system, and installs it on his laptops. The EmailMe tracking client software sends an email (like an exemplary email 10 that is shown in FIG. 1) to his webmail account every time the laptop connects to the Internet. Exemplary tracking email 10 is sent unencrypted by PC Phone Home from a laptop computer and include an email address 12 for Vance, his actual street address 14 and work phone number 16, his Internet Protocol (IP) address 18a (when the email was sent), and his media access control address 18b for his computer. Months later, Vance is distracted while working at his favorite coffee shop, and a thief takes his laptop. Now Vance's foresight appears to pay off: he uses a friend's computer to access the tracking emails sent by his missing laptop. Working with the authorities, they are able to determine that the laptop last connected to the Internet from a public wireless access point in his home city (based on IP address 18a). Unfortunately the physical location was hard to pinpoint from just the IP addresses. A month after the theft, Vance stops receiving tracking emails. An investigation eventually reveals that the thief sold the laptop at a flea market to an unsuspecting customer. That customer later resold the laptop at a pawn shop. The pawnbroker, before further reselling the laptop, must have refurbished the laptop by wiping its hard drive and installing a fresh version of the operating system.

Discussion

The theft of Vance's laptop highlights a few issues regarding limitations on the functionality of device tracking systems. First, a client tracking program without hardware-support can provide network location data only when faced by such a flea-market attack, which occurs when a technically unsophisticated thief steals a device to use it or sell it (with its software intact) as quickly as possible. Second, network location information will not always be sufficient for precisely determining the physical location of a device. Third, all clients (even those with hardware support) can be disabled from sending location updates (simply by disallowing all Internet access or by filtering out just the location updates if they can be isolated).

The principal goal is not to achieve better Internet tracking functionality than can be offered by existing solutions. Instead, privacy concerns are addressed while maintaining device tracking functionality equivalent to solutions with no or limited privacy guarantees. The next scenarios highlight the types of privacy concerns inherent to tracking systems.

Scenario 2

A few weeks before the theft of Vance's laptop, Vance was the target of a different kind of attack. His favorite coffee shop had been targeted by crackers because the shop is in a rich neighborhood and their routers are not configured to use WPA. The crackers recorded all the coffee shop's traffic, including Vance's location-update emails, which were not encrypted. (The webmail service did not use TLS, nor does the EmailMe client encrypt the outgoing emails.) The crackers sell the data garnered from Vance's tracking emails to identity thieves, who then use Vance's identity to obtain several credit cards.

Need to Encrypt Location Information

The content of location updates should always be sent via encrypted channels, lest they reveal private information to passive eavesdroppers. This feature is of particular importance for mobile computing devices, because of their almost universal use of wireless communication, which may or may not use encryption. As an alternative to or in addition to encryption, it may be desirable to use cryptography to authenticate the location information, i.e., to ensure that the location information has been determined and stored by the electronic device and not by some other entity or party.

Scenario 3

Vance works as a salesman for a small distributor of coffee-related products, called Very Good Coffee (VGC). He recently went on a trip abroad for VGC to investigate purchasing a supplier of coffee beans. On his return trip, he was stopped at customs and his laptop was temporarily confiscated for an "inspection." Vance, with his ever-present foresight, had predicted this would happen and had encrypted all his sensitive work-related files, removing any information that might disclose what he had been doing while in the foreign country. The laptop was shortly returned by the customs agent, with files apparently unmodified.

Unknown to Vance, the EmailMe client had cached all the recently visited network locations on the laptop. Included were several IP addresses used by the supplier that VGC intended to purchase. The customs agents sold this information to a local competitor of VGC. Using this tip, the local competitor successfully blocked VGC's bid to purchase the supplier.

Forward Privacy

This scenario addresses the need for forward privacy. A tracking client should not cache previous locations, lest a thief (or even, as the scenario depicts, some other untrusted party with temporary access to the device) easily break the owner's past location privacy.

Scenario 4

Hearing about Vance's recent troubles with property and identity theft, the VGC management chose to contract with (the optimistically named) All Devices Recovered (All-DevRec) to provide robust tracking services for VGC's mobile assets. AllDevRec, having made deals with laptop manufacturers, ensures that VGC's new laptops have hardware-supported tracking clients installed. The clients send updates using a proprietary protocol over an encrypted channel to AllDevRec's servers each time an Internet connection is made.

Ian, a recovery-management technician employed by All-DevRec, has a good friend, Eve, who happens to work at a business that competes with VGC. Ian brags to Eve that his position in AllDevRec allows him to access the locations from which VGC's employees access the Internet. This gives Eve an idea, and so she convinces Ian to give her information on the network locations visited by VGC sales people. From this information, Eve can infer the coffee shops that VGC is targeting as potential customers, enabling her company to precisely undercut VGC's offerings.

Encrypted Location Information Storage

Using encrypted channels is insufficient to guarantee data privacy once the location updates reach a service provider's storage systems. The location updates should remain encrypted while stored. This requirement mitigates the level of trust that device owners must place in a service provider's ability to enforce proper data management policies (to protect against insider attacks) and security mechanisms (to protect against outsiders gaining access to the location information).

Scenario 5

Vance, now jobless due to VGC's recent bankruptcy, has been staying at Valerie's place. Valerie works at a large company, with its own in-house IT staff. The management decided to deploy a comprehensive tracking system for mobile computing asset management. To ensure employee acceptability of a tracking system, the management had the IT staff implement a system with privacy and security issues in mind. Specifically, each device is assigned a random identification number and a public key/secret key pair for a public-key encryption scheme. A database mapping a device to its identification number, public key, and secret key is stored on a system with several procedural safeguards in place to ensure no unauthorized accesses. With each new Internet connection, the tracking client sends a location update encrypted under the public key and indexed under the random identification number.

When Valerie goes to lunch (which varies in time quite a bit depending on her work), she heads across the street to a cafe to get away from the office. She often uses her company laptop and the cafe's wireless to peruse the Internet. Since deployment of the new tracking system, Valerie has been complaining that no matter when she takes lunch, Irving (a member of the IT staff who is reputed to have an unreciprocated romantic interest in her) invariably seems to arrive at the cafe a few minutes after she does.

Because the location updates sent by Valerie's laptop use a static identifier, it was easy for Irving (even without access to the protected database) to infer which was hers; he looked at identifiers with updates originating from the block of IP addresses used within Valerie's department and those used by the cafe, After a few guesses (which he validated by simply seeing if she was at the cafe), Irving determined her device's identification number and from then on knew whenever she went for lunch.

Associating Updates with Device

The use of unchanging identifiers (even if originally anonymized) enables linking attacks, in which an adversary who is observing updates can associate updates from different locations as being from the same device.

Additionally, the finely-grained timing information revealed by sending updates upon each new Internet connection is a side-channel that can leak information.

Summary of Lessons Learned from Scenarios

The sequence of scenarios provided above depicts the wide variety of potential users of tracking systems. Moreover, they highlight two fundamental security issues.

Vance was a victim of compromised device tracking. (Scenario 1.)

Vance, VGC, and Valerie were all victims of compromised location privacy. (Scenarios 2, 3, 4, and 5.)

The threat models related to achieving location privacy while retaining device tracking capabilities are complex because there exist numerous adversaries with widely varied powers and motivation such as:

The unscrupulous party in possession of a device, who is referred to herein as a thief. The thief of a device might be unsophisticated, or sophisticated and intent on disabling the tracking device, or sophisticated and wish to reveal past locations.

Internet-connected outsiders that might intercept update traffic (e.g., the crackers at the coffee shop). Such adversaries call for ensuring the use of encrypted channels.

The remote storage provider, or the entity controlling the system(s) that store location updates, might be untrustworthy, suggesting the need for location up-dates that are anonymous, unlinkable, and encrypted, thereby denying private information even to the remote storage provider.

The Core Module: Providing Anonymous, Unlinkable Updates

The core module is the portion of a client primarily responsible for preparing, scheduling, and sending location updates to the remote storage. The core module in an exemplary embodiment of the present approach is, consequently, the foundation of the tracking system's privacy maintaining properties. The core module stands by itself as a component that will work in numerous deployment settings, in addition to the setting handled by the full system (described below).

The discussion provided above illustrates that the core must provide mechanisms to achieve the following goals:

(1) ensure content sent to the remote storage is anonymous and unlinkable;

(2) ensure forward-privacy (stored data on the client device should not be sufficient for revealing previous locations that were visited by the client device);

(3) mitigate timing attacks; and (4) enable the owner to efficiently search the remote storage for updates.

Basic Design

A first approach for building a core would be to use a secure symmetric encryption scheme. That is, the owner of the client device to be protected could install on the client a secret key and also store a copy separately, perhaps printed on a piece of paper or stored on a secure removable token or memory medium. For each new Internet connection, the core would encrypt the location data using this secret key and immediately send the ciphertext comprising the encrypted location data to the remote storage. Goal (1) above would be satisfied (assuming one used a standard, secure encryption scheme) because these ciphertexts would indeed be anonymous and unlinkable. But, the other three goals are not met by only carrying out this step. A thief that accesses the device and the secret key could decrypt previous updates. Sending the ciphertext (encrypted location information) immediately upon detecting a new Internet connection also leaks fine-grained timing information. More importantly, since ciphertexts submitted by all users are anonymous, there is no efficient way for the owner to search the database to retrieve the encrypted location information updates for the owner's device.

The core in the present exemplary embodiment uses a more sophisticated approach to tackle the other goals while preserving the ability to address goal (1). Instead of a key for an encryption scheme, the owner initializes the client with a secret cryptographic seed for a pseudorandom generator (PRG). Each time the core of the tracking software is run, it uses the PRG and the seed to deterministically generate two fresh pseudo-random values, including an index and a secret key (for the encryption scheme). The location information is encrypted using the secret key. Alternatively or in addition to the key being used for encrypting, the key can be used for authenticating the location information that is determined and stored on the remote storage. The core sends both the index and the ciphertext to the remote storage. As before, the ciphertext reveals no information, but the index is pseudo-random as well, meaning the entire update is anonymous and unlinkable. Thus, goal (1) and goal (4) are satisfied, since the owner, having a copy of the original cryptographic seed, can recompute all of the indices and keys used, to determine the indices corresponding to the ciphertext that should be retrieved from the remote storage to locate a lost or stolen device. This technique enables an efficient search of the remote storage for the desired location updates, using the indices. Moreover, the indices do not reveal decryption keys nor past or future indices.

However, this approach does not yet satisfy goal (2), because a thief or customs official can also use the seed to generate all the past indices and keys. This problem is addressed by using a forward-secure pseudorandom generator (FSPRG); instead of using a single cryptographic seed for the lifetime of the system, the core also evolves the seed pseudorandomly. When run, the core uses the FSPRG and the seed to generate an index, secret key, and a new seed. The old seed is discarded (securely erased), so that it cannot be determined by someone gaining access to the client device. The properties of the FSPRG ensure that it is computationally incapable of "going backwards," so that previous seeds (and the associated indices and keys) remain unknown, even to a thief with access to the current seed on the client device. Again, the secret key that is generated can be used for encrypting the location information and/or authenticating the location information that is stored on the remote storage, to ensure that the location information was indeed determined and stored by the electronic device and not by some other fake source.

Finally, goal (3) is addressed by randomly selecting times to send the encrypted location updates to the remote storage. Using the FSPRG as a source of randomness, exponentially-distributed inter-update times (i.e., random intervals between updates) can be pesudorandomly generated. (This technique enables the owner to also recompute the inter-update times when accessing the location data on the remote storage, which will be useful for retrieval of the desired location information, as discussed below.) Such a distribution is memoryless, meaning that, from the remote storage provider's view, the next encrypted location update is equally likely to come from any client and will not identify the client providing it. The number of location updates sent can be tuned by adjusting the rate of the exponential distribution used in determining the pseudorandom intervals between location update transmissions.

Forward-Private Location Caching

The pseudorandom update schedule means that locations that might be missed are visited for only a short amount of time. However, to provide maximal evidentiary forensic data about the trajectories of a device after theft, the core can allow reporting all of the recently visited locations. Recent locations can be cached, but this breaks forward-privacy. Therefore the basic design is enhanced to include a forward-private location cache. Having a cache also provides a simple mechanism for adding temporal redundancy to updates (i.e., location data is sent multiple times to the remote storage over time), which can increase the ability to successfully retrieve updates.

Instead of just caching location data in the clear, the core can immediately encrypt new data sent from the location-finding module. The resulting ciphertext (encrypted location data) can then be added to a cache; the least recent ciphertext is expelled from the cache, in a first-in-first-out scheme. However, the cryptographic key generated by the current state's FSPRG cannot just be utilized, because a thief could decrypt any ciphertext files in the cache that were added since the last time the FSPRG seed was refreshed (e.g., from the time when the previous update was sent). Therefore a distinct FSPRG seed is used, which is called the cache seed, as the source for generating cache cryptographic keys for each location encountered. The cache seed is different than the seed used for generating cryptographic keys for the location information that is transmitted to the remote site. Each time the cache seed is used to encypt new location data, it is also used to generate a new cache seed and the prior one is securely erased. In this way forward privacy is guaranteed, since no data remaining in the core enabling a thief to decrypt previously generated ciphertexts. When its time to send an update of the location information, the entire cache is encrypted using the secret key generated by the FSPRG with the main seed, which is different than the cache seed. This (second) encryption ensures that the data stored at the remote storage cannot later be correlated with ciphertexts stored in the cache. Finally, the core "resets" the cache seed by generating a fresh one using the FSPRG and the main seed. This step associates a sequences of cache seeds to a particular update state. Freshness of location data is ensured by mandating that at least one newly generated ciphertext is included with each update submitted to the remote storage.

The owner can reconstruct all of the cache seeds for any state (using the prior state's main seed) and do trial decryption to recover locations. (The number of expected trials is the number of locations visited between two updates, and so this will be typically small.) Ciphertexts in the cache that are "leftover" from a prior update time period can also be decrypted, and this step can be rendered efficient if plaintexts include a hint (i.e., the number of states back) that specifies which state generated the keys for the next ciphertext entry.

Implementing an Exemplary Embodiment

Figure 2A:
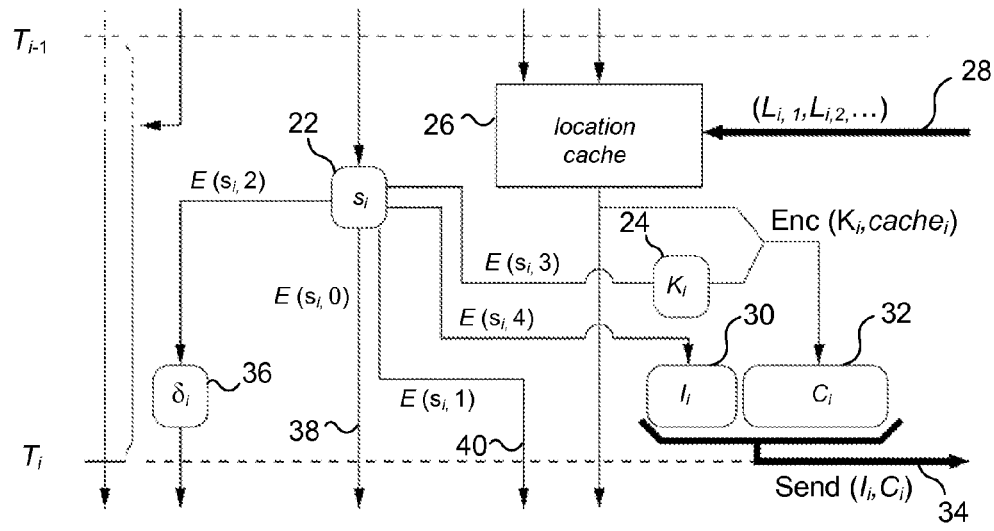
FIG. 2A is a schematic diagram illustrating the functionality of a core of an exemplary embodiment of the present novel approach for ensuring privacy while enabling the location of an electronic device to be tracked.

Implementing the core is straightforward, given a block cipher such as the Advanced Encryption Standard (AES). A standard and provably secure FSPRG implementation based on AES works as follows, where the proof is based on mathematical reductions from the security of the underlying components. A cryptographic seed is just an AES key (16 bytes). To generate a string of pseudorandom bits, one iteratively applies AES, under a seed s, to a counter: AES(s,1), AES(s,2), etc. For the present technique, there is an initial main seed $s_1$ and an initial cache seed $c_{1,1}$ (both randomly generated, e.g., at the time the tracking software is installed). The main seed $s_1$ is used to generate a new seed $s_2$=AES($s_1$,0), the next state's cache seed $c_{2,1}$=AES($s_1$, 1), and similarly, the cryptographic key, an index, and the next time offset. (The exponentially distributed time offset is generated from a pseudorandom input using the well known method of inverse-transform sampling.) After a seed is used, it must be securely erased. The cache seed forms a separate branch of the FSPRG and is used to generate a sequence of cache seeds that in turn are used to create intermediate cache cryptographic keys for use in encrypting the location information within the cache. FIG. 2A provides a schematic diagram 20 of the core module's operation between two successive updates at times $T_{i-1}$ and $T_i$. In this Figure, the pseudorandom seed from time $T_{i-1}$ is used to generate a new pseudorandom seed $s_i$ in a block 22, for use at time $T_i$. Each pseudorandom seed thus represents a state. Seed $s_i$ is used to generate a cryptographic key $K_i$ for use at time $T_i$ shown in a block 24 that can be employed to encrypt the contents of a location cache 26 which were determined based on the location information supplied on an input line 28. In carrying out the encryption of the contents of the location cache, E is a block cipher (e.g., AES) instantiating the FSPRG, and Enc is a standard encryption scheme. The current pseudorandom seed in block 22 is also used to determine an index $I_i$ in a block 30 that will be associated with an encrypted information data file $C_i$ in a block 32 for subsequent transmission to a remote storage when output over a line 34. Further, the current pseudorandom seed in block 22 is used to generate a pseudorandom inter-update time (or interval) $\delta_i$ in a block 36. The current pseudorandom seed in block 22 is also used to generate the next pseudorandom cache seed (a line 40) and the next pseudorandom seed $s_{i+1}$ (a line 38).

Figure 2B:
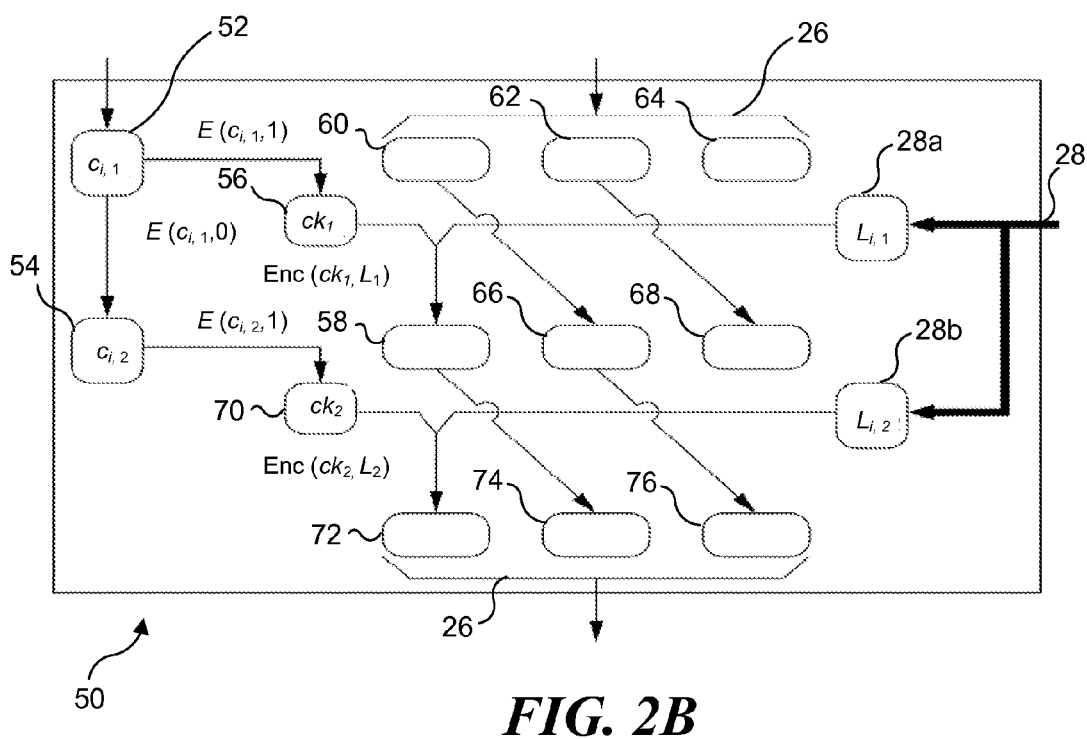
FIG. 2B is a schematic diagram illustrating the forward-private location caching used in the exemplary embodiment of FIG. 2A.

FIG. 2B illustrates a close-up of the core's forward-private location caching, where cache 26 holds three updates 60, 62, and 64; two new locations are shown as being stored. A pseudorandom cache seed $c_{i,1}$ in a block 52 is used to generate a successive pseudorandom cache seed $c_{i,2}$ in a block 54. Pseudorandom cache seed $c_{i,1}$ is used to generate a cache cryptographic key $ck_1$ in a block 56, which is used to encrypt location information $L_{i,1}$ in a block 28a, for storage in cache storage 58. The value in cache storage 60 is moved into a cache storage 66 (previously cache storage 62), and the value cache storage 62 is moved into a cache storage 68 (previously cache storage 64). When the next location information $L_{i,2}$ is determined, as indicated in a block 28b, that new location information is encrypted with a new cryptographic key $ck_2$ shown in a block 70, which is generated using $c_{i,2}$, and the encrypted value is then stored in cache storage 72. The encrypted location information in previous cache storage 58 is moved into a cache storage 74 (previously cache storage 66), and the encrypted location information in cache storage 66 is moved into a cache storage 76 (previously cache storage 68).

The encryption scheme can also be built using just AES, via an efficient block cipher mode such as Galois Counter Mode (GCM). Such a mode also provides authenticity. Of added benefit is that the mode can be rendered deterministic (i.e., no randomness needed), since only a single message is encrypted with each key. Consequently, the core (once initialized) does not require a source of true randomness. Also, as will be readily understood, the cryptographic key can be employed for authenticating the location information that is stored on the remote storage, i.e., to confirm that it was indeed determined and stored by the electronic device and not by another source.

Summary

To summarize, the core uses a sequence of secret seeds $s_1$, $s_2$, . . . to determine:
- a sequence $I_1, I_2, \ldots$ of pseudorandom indices under which to store ciphertexts (i.e., successive encrypted location data files);
- sequences $c_{i,1}, c_{i,2}, \ldots$ of secret cache seeds for each state i that are then used to encrypt data about each location visited for temporary retention in the cache;
- a sequence $K_1, K_2, \ldots$ of secret keys for further encrypting the contents of the entire cache before submission to the remote storage; and
- a sequence $\delta_1, \delta_2, \ldots$ of pseudorandom inter-update times for scheduling updates at pseudorandom intervals, while providing the following assurances. Given any $I_i$, $K_j$, or $\delta_j$, no adversary can (under reasonable assumptions) compute any of the other above-noted output values. Additionally, given $c_{i,j}$, no adversary can compute any of the other values except $c_{i,k}$, where k>j. Even if a thief views the entire internal state of the core on a client device, the thief still cannot compute any of the core's previously used indices, seeds, cache seeds, cryptographic keys, or inter-update times.

An Exemplary System—Private Tracking Using OpenDHT

A (privacy-preserving) tracking system includes three main components: the device, the remote storage, and an owner. The device component itself includes a location-finding component, and a core component. Other components, such as a camera image capture functionality, can easily be incorporated to capture forensic information that includes images of the user and/or background near the electronic device, or an accelerometer that can be used for inertial tracking of the electronic device as it is moved about, and other types of forensic information that can be helpful in determining the location of the device and for providing legal evidence if charges are brought against a person who may have stolen the electronic device. The system works in three phases, including initialization, active use, and retrieval. The core has already been discussed. The following discussion is directed to providing a complete privacy-preserving device tracking system using the core.

One goal is to develop an open-source and immediately deployable system to enable evaluation of the techniques during real usage, as well as providing to individual users an immediate and first alternative to the plethora of existing, proprietary tracking systems, none of which achieve the level of privacy that is targeted by the present novel approach, and which is believed will be important to many users. Along these lines, the following discussion focuses on an exemplary embodiment or model for an open source software-only client. In this exemplary embodiment, the public distributed storage infrastructure OpenDHT™ is used for the remote storage facility. Not only does this obviate the need to set up dedicated remote storage facilities, enabling immediate deployability, but it also effectively removes the system's reliance on any single trusted third party, since a host or host system is not required. This approach adds significantly to the practical privacy guarantees of the system.

The design of the complete exemplary system is now discussed. The client consists of the core that was discussed above (with a few slight modifications as described below), and a location-finding module, which is also described below.

OpenDHT as Remote Storage

A distributed hash table (DHT) enables insertion and retrieval of data values based on hash keys. OpenDHT is an implementation of a distributed hash table (DHT) whose nodes run on PlanetLab™ servers. The indices generated by the core are used as the hash keys and the ciphertext (encrypted location) data are stored under them. There are several benefits to using a public, open-source DHT for the remote storage. First, existing DHTs such as OpenDHT are already deployed and usable, so that deployment of the tracking system only requires distribution of software that runs on the client device to store the encrypted location data, and on a different device for retrieval of the location information after the client device has gone missing. Second, a DHT can naturally provide strengthened privacy and security guarantees, because updates will be stored uniformly across all the nodes of the DHT, since the node selected for storing a ciphertext file will be determined by the specific index associated with that ciphertext file. In decentralized DHTs, an attacker would have to corrupt a significant fraction of DHT nodes in order to mount Denial-of-Service or privacy attacks as the storage provider.

On the other hand, DHTs also have limitations. The most fundamental is a lack of persistence guarantee: the DHT itself provides no assurance that inserted data can always be retrieved. Fortunately, OpenDHT attempts to ensure that inserted data are retained for at least a week. Another limitation is temporary connectivity problems. Often nodes, even in OpenDHT, can be difficult to access, meaning the client will not be able to send an update successfully. The traditional approaches for handling such issues is to use client-side replication. This means that the client submits the same data to multiple, widely distributed nodes in the DHT.

The core used in the present system can easily be enhanced to include such a replication mechanism: have the core generate several indices (as opposed to just one) for each update. These indices, being pseudorandom already, will be distributed uniformly across the space of all DHT nodes. The update can then be submitted under all of these indices.

Scheduling Location Updates

The Adeona core provides a method to search for update ciphertexts via the deterministically generated indices. As noted, querying the remote storage for a set of indices does not reveal decryption keys or past or future indices. However, just the fact that a set of indices are queried for might allow the remote storage provider to trivially associate them to the same device. While the distributed nature of OpenDHT mitigates this threat, defense-in-depth asks that protection be even better. Therefore a mechanism is needed that ensures the owner can precisely determine which indices to search for when performing queries, and in particular allow the owner to avoid querying indices used before the device was lost or stolen.

To enable this functionality, the system precisely (but still pseudorandomly) schedules updates relative to some clock. The clock could be provided, for example, by a remote time server that the client and owner can synchronize against. Then, when the owner initializes the client, in addition to picking the cryptographic seed it also stores the current time as the initial time stamp $T_1$. Each subsequent state also has a time stamp associated with it: $T_2$, $T_3$, etc. These indicate the state's scheduled send time, and $T_{i+1}$ is computed by adding $T_i$ and $\delta_i$ (the pseudorandom inter-update delay). When the client is run, it reads the current time from the clock and iterates past states whose scheduled send time have already passed. (In this way the core will "catch up" the state to the schedule.) With access to a clock loosely synchronized against the client's, the owner can accurately retrieve updates sent at various times (e.g., last week's updates, all the updates after the device went missing, etc.). The assumption of a clock is discussed more in the security analysis provided herein.

Another option is to include software in the core module that detects the keystroke timings (or data input biometrics), since each person who inputs data on a keyboard or keypad tends to exhibit different timings between letters of the input words and phrases. By detecting if there is a change in the data input biometric data, the electronic device can detect that a different user than has previously been inputting data into the electronic device is doing so, which can be an indication that the electronic device is now being used by an unauthorized party, i.e., by a thief or by someone who found it after the electronic device was lost. In responding to such an event, the core module can initiate upload of a current information data file to the remote storage. Another such event that might be detected to initiate uploading of the current information data file to the remote storage is the detection of a change in the appearance characteristics of the person using the electronic device. For example, by using face recognition software, the electronic device can detect if the current user looks different in appearance than the person previously using the electronic device, which can cause the core module to upload the current information data file (with the current location information) to the remote storage.

Location-Finding Module.

The system works modularly with any known location finding technique (e.g., determining external IP address, trace routes to nearby routers, GPS, nearby 802.11 or GSM beacons, etc.). Three different location-finding mechanisms were implemented: light, medium, and full. The light mechanism just determines the internal IP address and the externally-facing IP address. (The latter being the IP as reported by an external server.) The medium mechanism additionally performs traceroutes to one or more randomly-chosen PlanetLab nodes. These traceroutes provide additional information about the device's current surrounding network topology.

The full mechanism employs a protocol that adapts state-of-the-art geolocationing techniques to the setting. Here, geolocationing refers to determining (approximate) physical locations from network data. Traditional approaches utilize a distributed set of landmarks to actively probe a target. These probes, combined with the knowledge of the physical locations of the landmarks, allows approximate geolocationing of the target. This approach is flipped around, using the active-client nature of the setting to have the client itself find nearby passive landmarks.

Concretely, Akamai™ nodes are utilized as landmarks: they are numerous, widespread, and often co-located within ISPs (ensuring some node is usually very close to the device). Akamai is purported to have about 25,000 hosts distributed across 69 countries. In a one-time pre-processing step, as many of their nodes as possible can be enumerated and then an existing virtual network coordinate system, Vivaldi™, can be applied to assign them coordinates. The location-finding module chooses several nodes randomly out of this set, probes them to obtain round-trip times, then uses these values and the nodes' pre-computed virtual coordinates to determine the device's own virtual coordinates. Based on the virtual coordinates, the module determines an additional set of landmarks that are close to it in virtual coordinate space and issues network measurements (pings and traceroutes) to these close landmarks. These measurements, in addition to the device's current internal- and external-facing IP addresses, are submitted to the core module as the current location information. After retrieval, this information can be used to geolocate the device, by potentially contacting the ISP hosting the edge routers.

Putting it All Together

The exemplary embodiment of the system in its entirety is described below. A state of the client consists of the main cryptographic seed, the cache and its seed, and a time stamp. The main seed is used with an FSPRG to generate values associated to each state: the DHT indices, a cryptographic key, and an inter-update time. It also generates the next state's main seed and the next state's cache seed. The time stamp represents the time at which the current state should be used to send location information to the remote storage.

(Initialization) The owner initializes the client by choosing random seeds and recording the time of initialization as the first state's time stamp. The cache is filled with random bits.

(Active use) The main loop of the client proceeds as follows. The client, when executed, reads the current state and retrieves the current time (from, for example, the system clock of the device). The client then transitions forward to the state that should be used to send the next update, based on the current time and the state's scheduled send times. The location cache uses its seed to appropriately encrypt each new location update received from the location module. At the scheduled send time, the main seed is used to generate several indices and a cryptographic key. The latter is used to encrypt the entire cache. The encrypted result is inserted into OpenDHT under each index. The client then transitions to the next state, which means generating the next state's seed, the next state's cache seed, and the scheduled update time (the sum of the current update time and the inter-update delay). The old state data, except the cache, are erased.

(Retrieval by owner) To retrieve location information, the owner can use the copy of the initial state that was separately securely saved by the owner to recompute the sequence of states, their scheduled send times, and their associated indices and keys—up through the time that the owner wants to determine the location of the device. From this information, the owner can determine the appropriate indices to search at the remote storage (being careful to avoid indices from before the device went missing). After retrieving the encrypted location information, the owner can decrypt it as described herein.

(Retrieval by third party) If a device is known or believed to be lost or stolen during a specific period of time, then the owner could also derive and give only the relevant indices and keys for that time period to a third party. The third party would then be able to do the lookups and location information retrievals on behalf of the owner. Doing so should not impact the location privacy for the device during other time intervals before it was lost or stolen. Similarly, the owner could give the third party a single recovery state value, which might be a pseudo-random seed. The third party could derive all subsequent states and the corresponding indices and keys. The third party would then be able to do the lookups and location information retrievals on behalf of the owner. If the state corresponds to a time after which the device went missing, then doing so should not impact the location privacy for the device prior to it going missing, since the state information for a point in time cannot be used to determine state information, and thus location information, for prior times. If the device is recovered, to preserve privacy, the device owner can reinitialize the tracking software on the device, so that the previous information given to the third party is no longer useful for accessing information stored after the tracking software was reinitialized.

Security Analysis

The system is designed to ensure location privacy, while retaining as much as possible the tracking abilities of solutions that provide weaker or no privacy properties. While other security evaluations and challenges in other sections are discussed, several key issues are treated below:

Location Privacy

A privacy set of at least two participating devices is assumed for this system, and this assumption does not consider omniscient adversaries that, in particular, can observe traffic at all locations visited by a device. (Such a powerful adversary can trivially compromise location privacy, assuming the device uses a persistent hardware MAC address.) The goal of adversaries is to use the present system to learn more than their a priori knowledge about some device's visited locations. Because updates transmitted to the remote storage are anonymous and unlinkable, outsiders that see update traffic and the remote storage provider will not be able to associate the updates to a specific device. While the storage provider might associate updates that are later retrieved by the owner, this knowledge does not reveal anything about other location updates sent to the remote storage by the owner's device. The randomized schedule obscures timing-related information that might otherwise reveal which device is communicating an update to the remote storage. Note also that the landmarks probed in the geolocationing module only learn that some device is probing them from an IP address. The thief cannot break the owner's location privacy due to forward privacy guarantees.

Outsiders and the storage provider do learn that some device is at a certain location at a specific time (but not which device). Also, the number of devices currently using the system can be approximately determined (based on the rate of updates received), which could, for example, reveal a rough estimate of the number of devices behind a shared IP address. Moreover, these adversaries might attempt active attacks. For example, upon seeing an incoming update, the provider could immediately try to fingerprint the source IP address. Distributing the remote storage as is done with OpenDHT naturally makes such an attack more difficult to mount. There are also known preventative measures that mitigate a device's vulnerability to such attacks. Finally, attacks on the system of this type could be protected against by sending updates via a system like Tor (in deployment settings that would allow its use), which obfuscates the source IP address.

Custom settings for the system's various parameters might reduce a device's privacy set. For example, if a client uses a cache size distinct from others, then this fact will serve to differentiate that client's updates that are transmitted to the remote storage. Likewise if a client submits more (or fewer) copies of each update to the remote storage, then the storage provider or outsiders might be able to differentiate its updates from those of other devices. Finally, a rate parameter significantly different from other clients' could allow tracking of the device.

Device Tracking

The goal of device tracking relates to a system's ability to ensure updates about a missing device are retrieved by the owner. As noted above, a goal is for the present system to engender the same tracking functionality as systems with weaker (or no) privacy guarantees. Therefore, attacks are not considered that would also disable a normal tracking system, including: disabling the client, cutting off Internet access, destroying the device, etc. (Existing approaches to mitigating these attacks, like clever software engineering and/or hardware or BIOS support, are also applicable to these designs.) Nevertheless, the present system, as described above, does have some limitations in this regard. Specifically:

OpenDHT does not provide everlasting persistence, which means that tracking fails for location updates more than a week old. Note that the location cache mechanism can be used to extend this time period. An alternate remote storage facility could also be used, as discussed below.

The present system schedules its updates at random times. If the device has Internet access for only a short time, the system could miss a chance to send its update to the remote storage. This problem can be trivially mitigated by increasing the rate of the exponentially-distributed inter-update times (i.e., increase the frequency of updates), but at the cost of efficiency, since this solution to the problem would mean sending more updates.

The absolute privacy of retrieval relies on the device having a clock that the owner is loosely synchronized against. The client relies on the system clock to schedule updates. A thief could abuse this approach, for example, by forcing the device's system clock to not progress. In the current exemplary implementation, the result would be to disrupt sending updates. Solutions for this problem are discussed below.

The present system relies on a stored state, and a thief could disable the system by tampering with it. For example, flipping even a single bit of the state data will make all future updates unrecoverable. To ensure that the thief has to disable the client itself (and not just modify its state) a tamper-evident FSPRG can be used in connection with a "panic" mode of operation.

For some of the disadvantages identified in these bullets, recall that many thieves will be unsophisticated. Therefore, in the common case, the likelihood of the above attacks is small. (And, indeed, a sophisticated attacker could also compromise the tracking functionality of existing commercial, centralized alternatives.)

The present novel system, like existing tracking systems, might not work well with some other mobile device security tools. For example, using a secure full-disk encryption system could render all software on the system unusable, including tracking software.

Finally, while not a primary goal of its design, the privacy mechanisms of the present system can actually improve tracking functionality. For one, the authentication of updates provided by the encryption mode means the owner knows that any received update was sent using the keys on the device, preventing in-transit tampering by outsiders or by the remote storage provider. That updates are anonymous makes targeted Denial-of-Service attacks, in which the storage provider or an outsider attempts to selectively block or destroy an individual's updates, exceedingly difficult, if not impossible.

Implementation and Evaluation

To investigate the efficiency and practicality of the system, several versions of the present system have been implemented as user applications, initially, for both Linux™ and Mac OS X™. More recently, versions of the system that run on Microsoft Corporation's Windows XP™ and Vista™ operating systems have also been publicly released. In all the versions, AES was used to implement the FSPRG. Encryption was performed using AES in counter mode and HMAC-SHA1 in a standard Encrypt-then-MAC mode. The OpenSSL crypto library provided implementations of these primitives. Note that HMAC was used for convenience only; an implementation using AES for message authentication would also be straightforward, if alternatively used. The rpcgen compiler was used to generate the client-side stubs for OpenDHT's put-get interface over the Sun™ RPC protocol. Perl scripts were also used to facilitate installation. Three main versions are focused on, as discuss below.

0.2.1 implements the core functionality described above. It uses the medium location-finding module. The source code for 0.2.1, not including the libraries mentioned above, consists of 7,091 lines of unoptimized C code. (Count includes comments and blank lines, i.e., calculated via wc −1*.) A derivative of this version is now publicly available.

0.2.0 is a slightly earlier version of 0.2.1, which differs in that it uses a simpler version of the forward-private location cache. Its cache only handles locations observed during scheduled updates (as opposed to more frequent checks for a change in location, meaning that locations could be missed if ill-timed). The source code for 0.2.0 consists of 5,231 lines of unoptimized C code. This version was deployed in the field trial described below.

0.1 uses the same ciphertext cache mechanism as 0.2.0, and additionally includes the tamper-evident FSPRG that will be described below, the panic mode that will be described, and the full location-finding mechanism described below. The tamper-evident FSPRG is implemented using the signature scheme associated to the Boneh-Boyen identity-based encryption (IBE) scheme and the anonymous IBE scheme is implemented using Boneh-Franklin in a hybrid mode with the Encrypt-then-MAC scheme described above. The two schemes rely on the same underlying elliptic curves that admit efficiently computable bilinear pairings. It relies on the Stanford Pairings-Based Crypto (PBC) library version 0.4.11 and specifically the "Type F" pairings. Not counting the PBC library, this version is implemented in 9,723 lines of C code.

Performance

Several benchmarks were run to gauge the performance of the design mechanisms. The system hosting the experiments was a dual-core 3.20 GHz Intel Pentium 4™ processor with 1 GB of RAM. It was connected to the Internet via a university network.

Basic Network Operations

Table 1 gives the Wall-clock time in milliseconds (calculated via the get time of day system call) to perform each basic network operation: an OpenDHT put of a 1024-byte payload; an OpenDHT get of a 1024-byte payload; the time to do the eight traceroutes used in the medium location-finding mechanism; and, the time to do the full location-finding operation (as described in above). Each operation was performed 100 times. Shown is the min/mean/median/max time over the successful trials. The number of time outs (failures) for the put trials and get trials are shown in the column labeled T/O. The time out for OpenDHT RPC calls was set to 15 seconds in the implementation. For the location mechanisms, hop timeouts for traceroutes and timeouts for pings were set to 2 seconds (here an individual probe time out does not signify failure of the operation).

TABLE 1

Wall clock time in milliseconds/operation to perform basic network operations: DHT put, DHT get, a medium location-finding operation, and a full location-finding operation.

|  | Min | Mean | Median | Max | T/O |
|---|---|---|---|---|---|
| Put | 207 | 1021 | 470 | 11463 | 2 |
| Get | 2 | 240 | 77 | 11238 | 3 |
| Loc medium | 5642 | 13270 | 15531 | 30381 | — |
| Loc full | 17446 | 36802 | 36197 | 63916 | — |

Space Utilization

Tables 2 and 3 detail the space requirements in bytes of the 0.2.1 version (0.2.0 has equivalent sizes) with light and medium location mechanisms and the 0.1 version with the full location mechanism. Here, and below, the parameter r specifies the size of the ciphertext cache used. When r=0, no cache was used (only the current location is inserted during an update). For ease-of-use (i.e., so one can print out or copy down state information), all persistently stored data were encoded in hex, meaning the sizes of stored state are roughly twice larger than necessary. The use of asymmetric primitives by the 0.1 version for the tamper-evident FSPRG functionality and the use of the IBE scheme account for the larger space utilization of this version.

TABLE 2

Typical sizes in bytes of state and update data used by the 0-2.1 version on a 32-bit system, for different sizes of the ciphertext cache specified by r.

| 0.2.1 | r = 0 | r = 10 | r = 100 |
|---|---|---|---|
| Owner state | 75 | 75 | 75 |
| Client state (light) | 75 | 876 | 8076 |
| Update (light) | 36 | 400 | 4000 |
| Client state (medium) | 75 | 27116 | 270476 |
| Update (medium) | 1348 | 13520 | 135200 |

TABLE 3

Typical sizes in bytes of state and update data used by the 0.1 version on a 32-bit system, for different sizes of the ciphertext cache specified by r.

| 0.1 | r = 0 | r = 10 | r = 100 |
|---|---|---|---|
| Owner state | 3544 | 3545 | 3548 |
| Client state (full) | 1779 | 30824 | 292184 |
| Update (full) | 1452 | 14520 | 145200 |

Microbenchmarks

The focus here is on the 0.1 version, which uses more expensive cryptographic primitives (elliptic curves supporting bilinear pairings); this version needs to be assessed to determine whether the extensions relying on these primitives hinder performance significantly. Table 4 gives running times in milliseconds/operation for the basic operations used by the 0.1 version. (The times for non-panic encryption, decryption, update, and retrieve are omitted; these times were at most those of the related panic-mode operations) These benchmarks only used the light location-finding mechanism and each update was inserted to a single OpenDHT node. The OpenDHT node may internally replicate data to other OpenDHT nodes. Each operation was timed for 100 repetitions both using the clock system call (the CPU columns) and gettimeofday (the Wall columns); shown is the min/mean/median/max time over the successful trials. Where applicable, the number of time outs (due to DHT operations) are shown in the column labeled T/O. Note that the retrieve operations only include retrieval for a single update. These benchmarks show that the extensions are not prohibitive: performance is dependent almost entirely on the speed of network operations.

TABLE 4

Time in milliseconds to perform basic operations in the 0.1 version.

| Operation | CPU | | | | Wall | | | | T/O |
|---|---|---|---|---|---|---|---|---|---|
|  | Min | Mean | Median | Max | Min | Mean | Median | Max |  |
| Initialize core | 210 | 329 | 330 | 460 | 215 | 367 | 348 | 1082 | — |
| Verify FSPRG state | 340 | 456 | 470 | 610 | 351 | 494 | 474 | 1240 | — |
| Panic encryption | 90 | 95 | 90 | 110 | 93 | 101 | 95 | 207 | — |
| Panic decryption | 80 | 90 | 90 | 100 | 85 | 104 | 90 | 934 | — |
| Panic update r = 0 | 440 | 559 | 570 | 700 | 612 | 1653 | 977 | 15347 | 9 |
| r = 10 | 440 | 543 | 545 | 680 | 818 | 2289 | 1311 | 20582 | 10 |
| r = 100 | 540 | 666 | 690 | 800 | 2953 | 12599 | 7439 | 165950 | 5 |
| Panic retrieve r = 0 | 80 | 89 | 90 | 100 | 92 | 499 | 207 | 12003 | 7 |
| r = 10 | 80 | 87 | 90 | 100 | 93 | 705 | 335 | 9734 | 12 |
| r = 100 | 80 | 87 | 90 | 100 | 116 | 2458 | 1555 | 21734 | 5 |

Geolocation Accuracy

The system has been designed to convey various kinds of location information to the remote storage. Previously proposed network measurement analysis techniques and/or database lookups to process the stored location information can be relied on and then, a geographical estimate can be derived. The strengths and weaknesses of such techniques are well-documented. Therefore the evaluation is focused on the active client-based measurement technique described above that attempts to identify a set of nearby passive landmarks given a large number of geographically distributed landmarks.

About 225,412 open DNS servers were accumulated by querying Internet search engines for dictionary words and collecting the DNS servers that responded to lookups on the resulting hostnames. Next, 8,643 Akamai nodes were enumerated across the world by querying the DNS servers for the IP addresses of hostnames known to resolve to Akamai edge servers (e.g., www.nba.com). Finally, 50 PlanetLab nodes were used as stand-ins for lost or stolen devices across the United States.

Figures 3A, 3B:
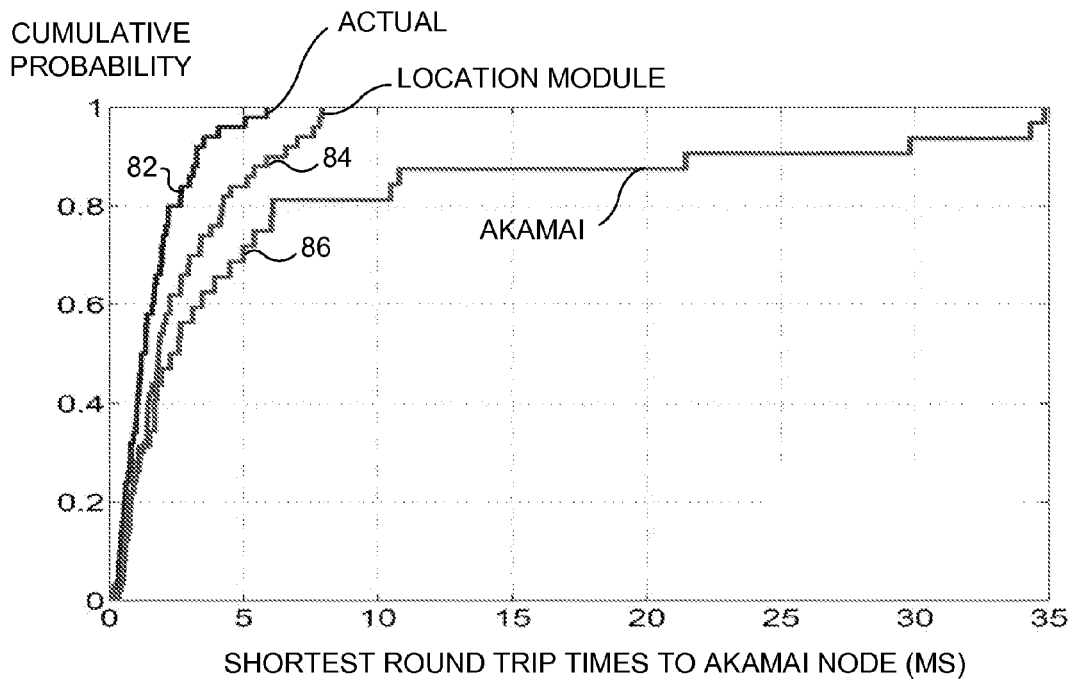
FIG. 3A is a graph illustrating the cumulative distribution of the shortest roundtrip time (RTT) to an Akamai node found by the location module used in an exemplary embodiment of the present approach, compared to the actual closest Akamai node, and Akamai's own content delivery algorithm.
FIG. 3B is a table of field trial retrieval rates, retrieval times, and other results resulting from a test of an exemplary embodiment of the present approach.

Having both targets and landmarks, round-trip time (RTT) measurements were obtained from the PlanetLab nodes to the passive Akamai servers. The PlanetLab nodes were able to obtain measurements to 6,200 of the Akamai servers on the list. It was then possible to evaluate the geolocation technique by running it over these measurements. FIG. 3A is a graph 80 that plots the cumulative distributions of the results and the RTT to the actual closest Akamai node along a line 82. FIG. 3A also plots the cumulative distribution of the RTT to an Akamai node as given by a simple DNS lookup for 32 of the 50 targets (the other 18 nodes went down at the time of measurement), as indicated by a line 84. The technique performs better than Akamai's own content delivery algorithms, as shown by a line 86 in FIG. 3A, for more than 60% of the targets considered. In addition, it was observed that an Akamai server can be found at most, 7 milliseconds away.

Field Trial

A small field trial was conducted to gain experience with the implementation of present novel approach, reveal potential issues with the design, and quantitatively gauge the efficacy of using OpenDHT as a remote storage facility. There were 11 participants, each running the 0.2.0 client with the same options: update rate parameter of 0.002 (about seven updates an hour on average), location cache of size r=4, and spatial replication of 4 (the system core tries to insert each update to four DHT keys). The clients were instrumented to locally log all the location updates submitted over the course of the trial. At the end of the trial, these client-side log files were collected plus each owner's copy of the initial state, and this data was used in an attempt to retrieve a week's worth of updates for each of the participants.

Results are shown in a table 90 of FIG. 3B. Here "# inserts" refers to the total number of successful insertions into the DHT by the client in the week period. The "Insert rate" column of the table measures the fraction of these inserts that were retrieved. The "# Updates" column shows the total number of updates submitted by each client. Note that the replication mechanism means that each update causes the client to attempt four insertions of the location cache. The "Update rate" column measures the percentage of location caches retrieved. As can be seen, this fraction is usually larger than the fraction of inserts retrieved, suggesting that replication across multiple DHT keys is beneficial. The "Locations Found" column reports the number of unique locations (defined as a distinct (internal IP, external IP) pair) found during retrieval versus reported. The final column measures the time, in minutes and seconds, that it took to perform retrieval for the user's updates for the whole week (note that retrieval for each user was parallelized).

It was observed that OpenDHT may return "no data" for a key even when, in fact, there are data stored under that key. (This was detected when doing multiple get requests for a key.) Indeed, the failure to find two of the user locations was due to this phenomenon, and in fact, repeating the retrieval operation found these locations as well.

Deployment Settings: Hardware Support and Dedicated Servers

Several settings have been highlighted above for device tracking: internal corporate systems, third-party companies offering tracking services, and community-supported tracking for individuals. Each case differs in terms of what resources are available to both the tracking client and the remote storage. As noted above, a description of the building of the Adeona system targeting a software client and OpenDHT repository was presented, which works well for the third setting. How the designs can work with other deployment scenarios is now described.

A hardware-supported client can be deployed in several ways, including an application specific integrated circuit (ASIC) implementing client logic, trusted hardware modules (e.g., a TPM or Intel's Active Management Technology™), or worked into existing system firmware components (e.g., a system's basic input-output system (BIOS)). Hardware-support can be effectively used to ensure that the tracking client can only be disabled by the most sophisticated thieves, and, possibly, that the client has access to a private and tamper-free state. However, targeting a system for use with a hardware-supported client adds to system requirements. The system's core is particularly suited for implementation in hardware. It relies on a single cryptographic primitive, AES, which is highly optimized for both software and hardware. For example, recent research shows how to implement AES in only 3,400 gates (on a "grain of sand"). In its most basic form (without a location cache), the core only requires 16 bytes of persistent storage.

In settings where a third-party company offers tracking services, the design requirements are more relaxed compared to a community-supported approach. Particularly, such a company might typically offer dedicated remote storage servers, which would enable handling persistence issues server-side. Further, this kind of remote storage is likely to provide better availability than DHTs, obviating the need to engineer the client to handle various kinds of service failures. The present system is thus slightly over-engineered for this setting (e.g., the replication technique discussed above could be eliminated). An interesting question that is raised in such a deployment setting is how to perform privacy-preserving access control. For reasons that should be apparent, these remote storage facilities would want to restrict the parties who are able to insert data into the remote storage. If traditional authentication mechanisms are used, the authentication tag might reveal who is submitting the update. Thus, it may be desirable to use newer cryptographic primitives, such as group or ring signatures that enable authentication while not revealing which member of a group is actually communicating the update to the remote storage. A client electronic device using such a service to store information data files would sign each upload of an information data file with a private key for the anonymous group signature scheme, where the group is defined by a trusted third party. The private key would be assigned to the client electronic device by this trusted third party. Also, instead of a single trusted third party, a plurality of trusted third parties might be employed to carry out this functionality. The remote storage service would then first verify the anonymous group signature on each information data file received before storing the file on the remote storage. In the event that the private key is stolen or otherwise is no longer private to the client electronic device to which it was originally signed, it will be removed from the group signature scheme so that the remote storage service or facility will then reject any uploaded information data file signed with the compromised private key.

Another option that might be implemented in connection with the present novel approach would be to enable a party in possession of the private recovery state needed to access the information data files and their contents from the remote storage to communicate with the electronic device, e.g., after it is lost or stolen. The private recovery state would be used by the party to compute a set of indices on the remote storage, enabling the party to upload commands at those indices, to the remote storage. These commands might be protected by encryption and digitally signed to provide authentication. The electronic device would be programmed to check for data at the indices, decrypt them and verify their authenticity (using the digital signature), and would then execute the instructions included in the commands. For example, if the electronic device has gone missing or is believed stolen, the party having the private recovery state information could store commands on the remote storage that would cause the electronic device to lock up and become unusable, or wipe its data and memory, or to take some affirmative step that might be useful in recovering the electronic device. These uploaded commands could also be protected with a group signature scheme, as discussed above, and compromised signing credentials could also be revoked, to prevent unauthorized commands from being executed by an electronic device.

Corporations or other large "organizations" might opt to internally host storage facilities, as per Scenario 5. Again, dedicated storage servers ease design constraints, meaning the system can be simplified for this setting. But, there is again the issue of access control. (Although in this setting, existing corporate VPN's, if these do not reveal the client's identity, might be used.) On the other hand, this kind of deployment raises other issues. Particularly, the privacy set is necessarily restricted to only employees of the corporation, and so, an adversary might be able to aggregate information about overall employee location habits, even if the adversary cannot track individual employees. To facilitate administration of the present approach when applied to a relatively large set of electronic devices (e.g., 100 s of electronic devices), it may be desirable to derive the successive states used by each different electronic device in the set from an initial state that is determined from a combination of a master state that is used for all of the electronic devices in the set, and a unique identifier for the electronic device for which the initial state is being determined. When retrieving the information data files for a specific electronic device from the remote storage, an administrator would then derive the initial retrieval state for the electronic device using the master state and the unique identifier for the electronic device, as explained herein.

Optionally, location updates could be encrypted with a public key (or anonymous public key) encryption scheme. A party who is retrieving an information data file from the remote storage could hold the corresponding private key to enable the retrieved information data file to be decrypted. This approach would make it harder for someone who compromises a state at time t from revoking the full privacy of the forensic data that are uploaded to the remote storage at a later time t'>t. Also, this approach might be an extra level of defense in depth for large-scale deployments where clients initially begin with the same state (and diversify the initial state by combining the master state with a unique identifier for the electronic device, such as the MAC address of each electronic device). It would also be possible to encrypt the uploaded information data files to multiple public keys, so both a user and company personnel might be able to track the electronic device when lost or stolen (which would be particularly valuable, e.g., in commercial or large scale deployments of the present approach).

As a way of minimizing the number of uploads of information data files to a remote storage, it is contemplated that the software program running on the electronic devices could be designed to suppress uploading a current information data file if the electronic device determines that it is at one or more predefined locations. For example, if the electronic device is normally used either at a specific residence or at an office location, when it detects that it is located at the residence or the office (or other predefined locations), the program running on the electronic device can be set so that it does not upload information data files to the remote storage, since the electronic device is neither lost nor stolen when at any of those locations. Or, if the electronic device is at a location that appears on a whitelist prepared by the user or an administrator, the electronic device may only be prevented from uploading information data files as often as it would otherwise. A variation on this approach would be to detect when the electronic device is joined in a network or paired with another device that has been predefined, and if so, to either suppress uploading information data files to the remote storage or reduce the frequency with which the information data files are uploaded. The other device might be a cell phone, a key fob, or a smart power charger, to name a few by way of example and without any implied limitation.

Figure 4:
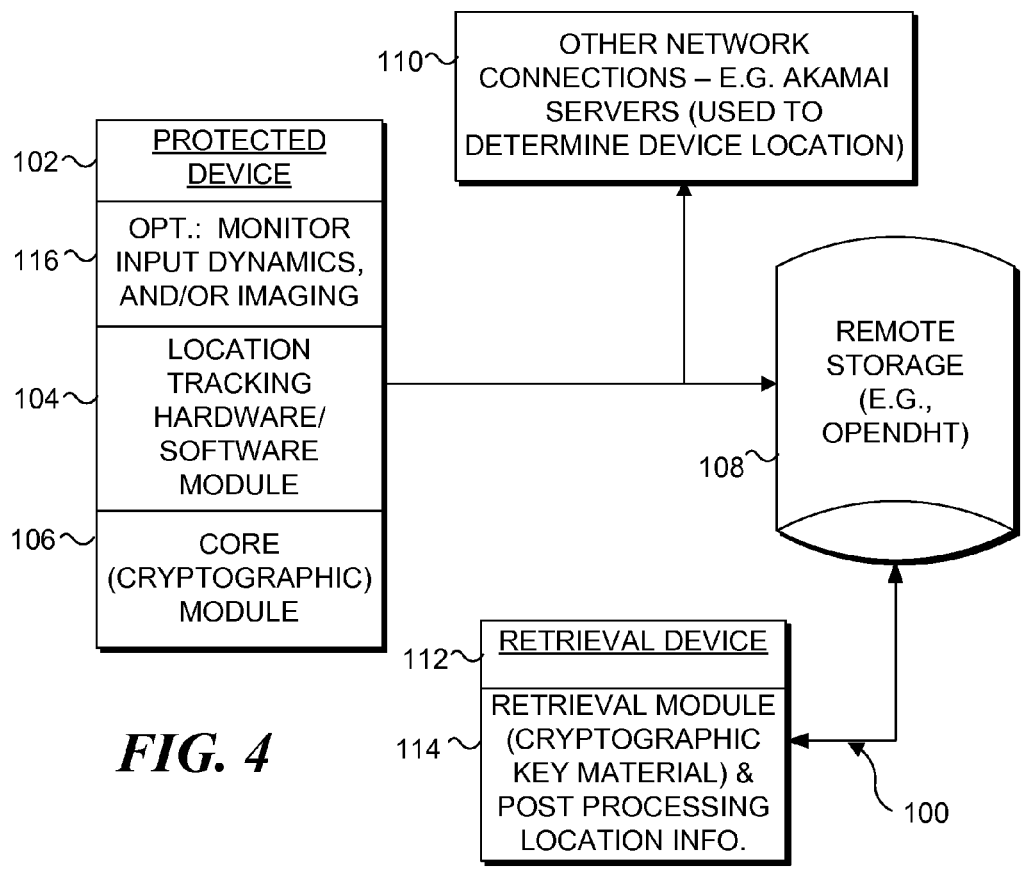
FIG. 4 is a functional block diagram of an exemplary system for implementing the present novel approach.

FIG. 4 illustrates a block diagram of an exemplary system 100 for implementing the present novel approach in connection with tracking a protected device 102 using a location tracking hardware/software module 104 to determine the location information indicating successive locations where the protected device is disposed. This location information is encrypted and stored on a remote storage 108, such as OpenDHT, by a core (encryption) module 106, which can be implemented using software executed on the protected device. The location tracking hardware/software module can connect over the Internet (or some other network to sites such as Akamai, which can be used to determine the current location of protected device 102, as indicated in a block 110. If the protected device is lost or stolen, a separate retrieval device 112 can be employed for implementing a retrieval module 114 (that uses cryptographic key material for decoding encoded files that are retrieved from remote storage 108). The retrieval module uses the initial pseudorandom seed information for the initial state that was retained separately by the owner of the protected device and kept secret, to determine the indices of encrypted location data files stored on the remote storage after the protected device was lost or stolen. The location information recovered from these files can then be used to determine where the protected device is currently located, so that it might be recovered, or for other purposes. Further details of the steps used for storing the encrypted location data files in association with the indices and for recovering the location information for the protected device are discussed below.

Exemplary Logical Steps for Storing Location Information

Figure 5:
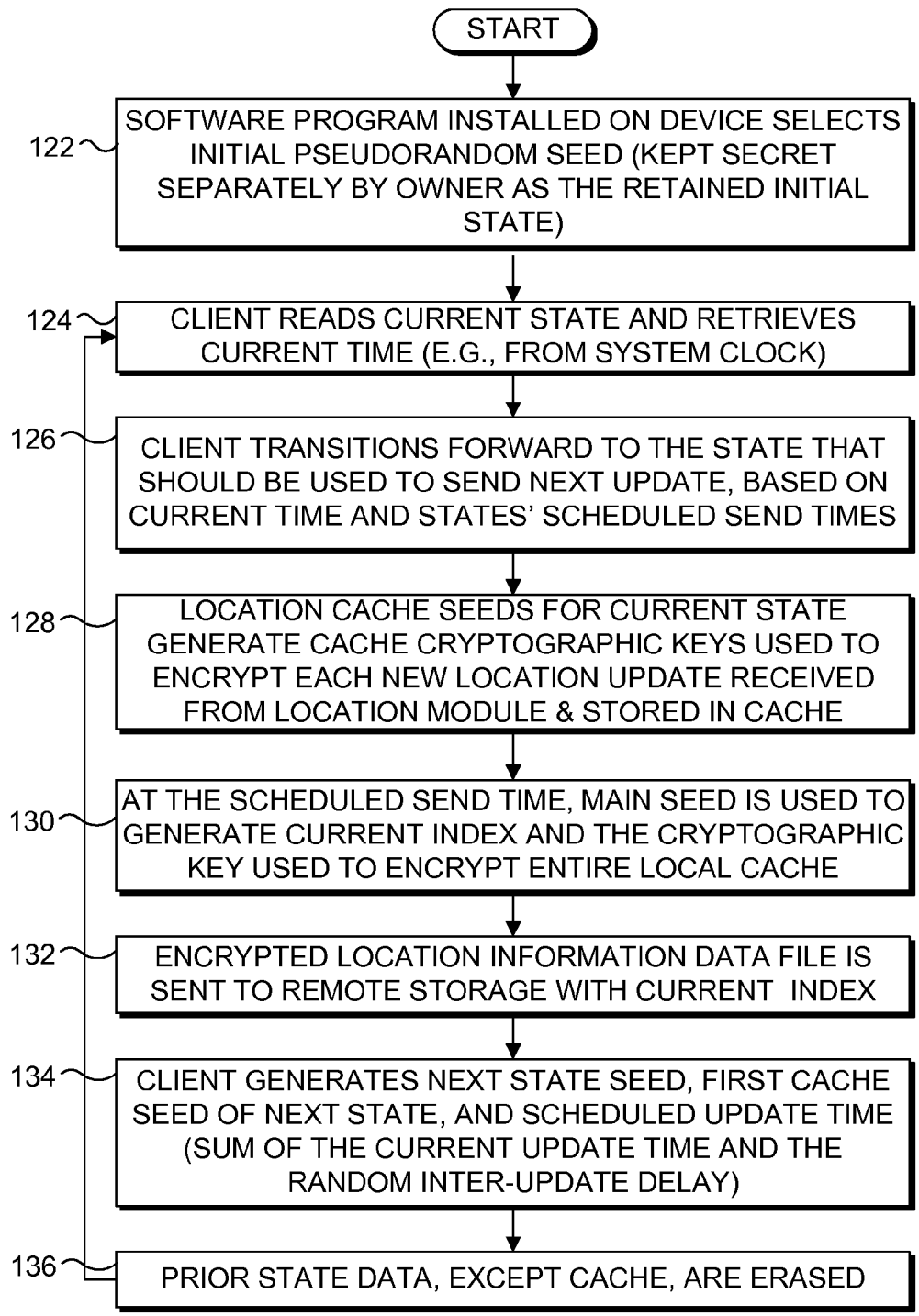
FIG. 5 is a flow chart illustrating exemplary logical steps that are implemented in storing encrypted location data files on a remote storage.

FIG. 5 illustrates exemplary logical steps 120 that are implemented on the electronic device being protected to determine current location information, encrypt the location information for temporary storage on the device, and further encrypt the location information that is stored on a remote storage site in association with indices that subsequently enable the encrypted location data files to be identified and retrieved after the protected electronic device is lost or stolen. This embodiment can be implemented by installing a software program on the electronic device that then runs to carry out the logical steps shown in FIG. 5. In a step 122, after the software program is installed on the electronic device to be protected, it executes and selects an initial pseudorandom seed, in connection with an initial time for tracking the electronic device location. The initial pseudorandom seed and the initial time comprise a state that is intended to be retained secret and separate from the electronic device being protected. For example, the retained initial state can be written on a piece of paper, or stored as a digital file on another computer or other type of electronic device, such as a memory device. The electronic device, which is also referred to herein as the "client device" then reads the current state and retrieves a current time for the system in a step 124. The current time can be determined from a system clock on a network, or from an online time standard over the Internet. In a step 126, the client device transitions forward to the state that should be used to send the next update of the encrypted information data file to the remote storage, such as OpenDHT. Since the time for updating the location information on the remote storage that is based upon the inter-update interval may be after the client device has been moved to several new locations, the client device uses the pseudorandom seed to generate a pseudorandom cache seed that is then used to generate successive cache pseudorandom seeds, each of which is employed to generate the cache cryptographic key used to encrypt the location information received from the location information module that is being temporarily stored in the cache, indicated in a step 128. At the next scheduled time for sending a location update to the remote storage, in a step 130, the main pseudorandom seed is used to generate a cryptographic key that is employed to encrypt all of the encrypted location information files temporarily stored in the cache at that time. The result is the encrypted information data file that is transmitted to the remote storage, along with the current index associated with that file, in a step 132.

It should be understood that current index and the current cryptographic key are generated using the current pseudorandom seed, which is in turn, generated from the previous pseudorandom seed, which is generated from its previous pseudorandom seed—back to the initial pseudorandom seed comprising the retained initial state. Accordingly, it is possible to determine the index associated with desired encrypted information data file that is stored on the remote storage for a particular point in time, given the retained initial state that is kept separate by the owner of the client device and based upon the total number of updates of the location information and the timing of those updates. Similarly, the successive pseudorandom cache seeds can also be determined based on the retained initial state.

After updating the remote storage with the current encrypted information data file, the client device generates the next state's pseudorandom seed, the first cache pseudorandom seed for the next state, and the pseudorandom inter-update interval, which will determine the time of the next update of the location information stored on the remote storage, in a step 134. Except for the cache, the prior state data are then erased on the client device in a step 136. The logic then loops back to step 124, to repeat for the current state. Except for the initial installation of the software that implements step 120, these steps will normally be carried out in the background without any active interaction by the owner of the client device and without providing any notice that any of the steps are being done. However, in this embodiment, no attempt is made to hide the existence of the software from an operator of the electronic device and its presence can readily be detected on the device.

Exemplary Logical Steps for Retrieving Location Information

Exemplary logical steps 140 for retrieving location information for a protected device in accord with the present approach are illustrated in the flowchart shown in FIG. 6. In a step 142, the owner (or a trusted third party) accesses the initial pseudorandom seed and the time of the initial state that was kept separate from the client device and kept secret by the owner of the client device being protected. This retained initial state is then used by the retrieval module software in a step 144 to recompute the sequence of states from that initial state, their scheduled send times (for storing the encrypted information data files on the remote storage), and the associated indices and cryptographic keys. The intention is to determine the indices associated with encrypted location information data after the protected client device was lost or stolen, so that the location information for the device from that time forward can be determined. There is no reason to determine location information for the protected electronic device for times before it went missing and that is avoided in a step 146. Based on the indices that have thus been determined, the encrypted locations information data files on the remote storage for the time after the device went missing are retrieved in a step 148. A step 150 then provides for decrypting these files to recover the locations of the device after it went missing. In addition to determining the appropriate pseudorandom seed that was used for determining the cryptographic key applied to encrypt each such recovered file, this step also involves reconstructing all of the successive pseudorandom cache seeds that were determined and applied for encrypting the location information being temporarily stored in the cache. The first cache pseudorandom seed that was used after the last update of the location information on the remote storage is based on the then current main pseudorandom seed, but each successive pseudorandom cache seed is then based on the preceding pseudorandom cache seed. The owner or a trusted third party should then be able to recover the location information and employ the information for determining the physical location of the missing protected electronic device, as explained herein.

Extensions to the Novel Approach

There are several extensions for the present system that highlight its versatility and extensibility. These include: removing the reliance on synchronized clocks; tamper-evident FSPRGs for untrusted local storage; a panic mode of operation that does not rely on state; the use of anonymous channels; and, enabling communication from an owner back to a lost device.

Avoiding Synchronized Time

The system, as described above, uses a shared clock between the client device and owner to ensure safe retrieval. This feature is realized straightforwardly if the client device is loosely synchronized against an external clock (e.g., via NTP). In deployment scenarios where the device cannot be guaranteed to maintain synchronization or where the thief might maliciously modify the system clock, the client and retrieval process can be modified as explained below.

Whenever the client device software is executed, it reads the current state (which is now just the current cryptographic seed for the FSPRG and the cache) and computes the inter-update time, $\delta$, associated with the state. It then waits that amount of time before sending the next update and progressing to the next state. For retrieval, the owner can still compute all of the inter-update times, and use these to estimate when a state was used to send an update. If the client runs continuously from initialization, then a state will be used when predicted by the sum of the inter-update times of earlier states. If the client is not run continuously from initialization, then a state might be used to send an update later (relative to absolute time) than predicted by the inter-update times. It is therefore privacy-preserving for the owner to retrieve any states estimated to be sent after the time at which the device was lost. The owner might also query prior states to search for relevant updates, while being careful not to go too far back (lest the owner begin querying for updates sent before the device was lost/stolen).

Detection of Client State Tampering

The system relies on the client's state remaining unmodified. Compared to a (hypothetical) stateless client, this approach enables a new avenue for disabling the device. To rectify this disparity between the ideal (in which an adversary has to disable/modify the client executable) and the actual system, a novel cryptographic primitive, a tamper-evident FSPRG, which enables cryptographic validation of state, was designed. By adding this functionality to the system, this avenue for disabling tracking functionality was removed. Moreover, it is believed that tamper-evident FSPRGs are likely of independent interest and might find use in further contexts where entrusted storage is in use, e.g., when the Adeona core is implemented in hardware but the state is stored in memory accessible to an adversary.

A straightforward construction would work as follows. The owner, during initialization, also generates a signing key and a verification key for a digital signature scheme. Then, the initialization routine generates the core's values $s_i$, $c_{i,1}$, $T_i$ values for each future state i that could be used by the client, and signs these values. The verification key and resulting signatures are placed in the client's storage, along with the normal initial state. The client device, to validate lack of tampering with FSPRG states, can verify the state's $s_i$, $c_{i,1}$, $T_i$ values via the digital signature's verification algorithm and the (stored) verification key. Unfortunately, this approach requires a large amount of storage (linear in the number of updates that could be sent). Moreover, a very sophisticated thief could just mount a replacement attack by substituting the thief's state, verification key, and signatures for the owner's. Note that this attack does not require modifying or otherwise interfering with the client executable.

These problems are overcome with the current system. To stop replacement attacks, a trusted authority can be used to generate a certificate for the owner's verification key (which should also tie it to the device). Then, the trusted authority's verification key can be hard-coded in the client executable and can be used to validate the owner's (stored) verification key. To reduce the storage space required, the owner, during initialization, only signs the final state's values. To verify, the client can seek forward with the FSPRG (without yet deleting the current state) to the final state and then verify the signature. (A counter can be used to denote how many states the client needs to progress to reach the final one.) Under reasonable assumptions regarding the FSPRG (in particular, that it's difficult to find two distinct states that lead to the same future state), and the assumption that the digital signature scheme is secure, no adversary will be able to generate a state that deviates from the normal progression, yet verifies. A clever thief might try to roll the FSPRG forward in the normal progression, to cause a long wait before the next update. This can be defended against with a straightforward check relative to the current time: if the next update is too far away, then assume adversarial modification. The signatures of some fraction of the intermediate states can also be stored in order to operate at different points of a space/computation trade-off.

Private Updates with Tampered State

If the client detects tampering with the state, then it can enter into a "panic" mode, which does not rely on the stored state to send updates. An owner of a device might have the panic mode just send updates in the clear (because these locations are presumably not associated with the owner), but there can be reasons not to do this. For example, configuration errors by an owner could mistakenly invoke panic mode.

Panic mode can still provide some protection for updates without relying on shared state, as follows. It is assumed that the client device and owner have access to an immutable, unique identification string ID. In practice this ID could be the laptop's MAC address. A cryptographic hash function can be used H: $\{0,1\}^* \to \{0,1\}^h$, such as SHA-256, for which h=256 bits. Then, pick a parameter $b \in [0 \ldots h]$. For each update, the client generates a sequence of indices via $I_1 = H(1\|T\|H(ID)|_b)$, $I_2 = H(2\|T\|H(ID)|_b)$, etc. Here, T is the current date and $H(ID)|_b$ denotes b bits of the result of hashing the ID. (Varying the parameter b enables a simple time-privacy trade-off known as "bucketization.")

Location information can be encrypted using an anonymous identity-based encryption scheme. Using a trusted key distribution center, each owner can receive a secret key associated with their device's ID. (It should be noted that the trusted key distribution center will also be able to decrypt updates. The role of the key distribution center could be distributed across multiple entities.) Encryption to the owner only requires the ID. This approach is useful because then encryption does not require stored per-device state, under the presumption that the ID is always accessible. The ciphertext can be submitted under the indices. The owner can retrieve these panic-mode updates by re-computing the indices using the ID and the appropriate dates, and then using a trial decryption.

Anonymous Channels

Systems such as Tor implement anonymous channels, which can be used to effectively hide the originating IP address of Internet traffic from recipients. The present system design can easily be made compatible with any such system by transmitting location updates to the remote storage across the anonymous channel. The combination of the present system with an anonymous routing system provides several nice benefits. Use of such a combination means that the remote storage provider and outsiders cannot trivially see the originating IP address, meaning active fingerprinting attacks are prevented. Additionally, such a combination merges the anonymity set of the present system with that of the anonymous channel system. For example, even if there exists only a single user of the present novel technology, that user might nevertheless achieve some degree of location privacy using anonymous channels.

On the other hand, attempting to use anonymous channels without the present system has several disadvantages. The complex client devices would not necessarily be suitable for some deployment settings (e.g., hardware implementations) and would force a reliance on a complex, distributed infrastructure in all deployment settings. This reliance is particularly undesirable in the corporate setting. Routing location updates through nodes not controlled by the company could actually decrease corporate privacy, since outsiders could potentially learn employee locations. When analyzing how to utilize anonymous channels and meet the tracking and privacy goals, it is easy to see that even with the anonymous channel, a device owner still benefits from the mechanisms provided by the present system. Imagine a hypothetical system based on anonymous channels. Because the remote storage provider is potentially adversarial, the system would still need to encrypt location information and so also provide an index to enable efficient search of the remote storage for a specific location update. Because the source IP is hidden, one might use a static, anonymous identifier, which would enable the remote storage provider to, at the very least, link update times to a single device and leak more information than if the indices are unlinkable.

Sending Commands to the Device

In situations where a device is lost, an owner might wish to not only retrieve updates from it, but also securely send commands back to it. For example, such a channel would enable remotely deleting sensitive data. A full duplex channel using the remote storage as a bulletin board can be securely instantiated. An owner could post encrypted and signed messages to the remote storage under indices of future updates. During an update, the client device would first do a retrieve on the indices to be used for the update, thereby receiving the encrypted and authenticated commands. Standard encryption and authentication tools can be used, including cryptographic keys derived from the FSPRG seed in use on the client device. A separate sequence of indices can also be used for this task. In terms of location privacy, the remote storage provider would now additionally learn that two entities are communicating via the bulletin board, but not which entities.

Conclusions

Mechanisms have been developed that enable a privacy-preserving device tracking system. The present system simultaneously hides a device owner's legitimately visited locations from powerful adversaries, while enabling tracking of the device after it goes missing (i.e., is lost or stolen). Moreover, these functions are implemented while using third party services that are not necessarily trusted in terms of location privacy. The mechanisms are efficient and practical to deploy. The client-side mechanisms, while initially implemented in software in an exemplary embodiment, are also well-suited for hardware implementations. Thus, it is apparent that not only can a user circumvent a trade-off between security and privacy, but can do so in practice, with real devices to which the novel approach is applied.

A full privacy-preserving tracking system has been implemented, based on OpenDHT, enabling immediate, community-orientated deployment. Its core module, a cryptographic engine that renders location updates anonymous and unlinkable, can easily be used in further deployment settings. To evaluate an initial embodiment of the system, a field trial was run to gain experience with a deployment on real user's electronic devices. The conclusion determined by this evaluation is that the approach is sound and represents an immediately viable alternative to tracking systems that offer less (or no) privacy guarantees. Lastly, numerous extensions to the present exemplary system were also contemplated that address a range of issues, including disparate deployment settings, increased functionality, and improved security. The techniques involved, particularly the tamper-evident FSPRG, are likely of independent interest, apart from their application in the context of the present novel approach for tracking devices.

Exemplary Computing Device for Implementing Tracking System

FIG. 7 schematically illustrates an exemplary device 240 suitable for implementing the present novel technique, in regard to comprising the electronic device that is being tracked, and also representing a different electronic device (such as a personal computer) that might be used to retrieve the location information for the electronic device after the electronic device has been lost or stolen. While other forms of logic devices can be employed, device 240 can comprise a logic device 254, e.g., a generally conventional personal computer (PC) such as a laptop, desktop computer, or a personal data assistant (PDA), a smart phone, or other form of logic processing device. This list of exemplary electronic devices is not intended to be inclusive, but instead, represents just some examples to the type of devices that may be tracked in accord with the present novel approach.

Logic device 254 is coupled to a display 258, which is used for displaying text and graphics to the user and is optional in an electronic device that is being tracked. Included within logic device 254 is a processor 252. A memory 256 (with both read only memory (ROM) and random access memory (RAM)), a non-volatile storage 250 (such as a hard drive or other non-volatile data storage device) for storage of data, digital signals, and software programs, a network interface 242, a sensor 246, and an optional imaging device 248, such as a web cam, are all coupled to processor 252 through a bus 244. Sensor 246 is indicated as being in the singular, but will be understood to represent one or more sensors of different types that can comprise, for example and without any implied limitation, an accelerometer for sensing acceleration for use in connection with an inertial tracking program for monitoring the movement of the device, a GPS for detecting location using global position satellites, a wireless signal detector (e.g., any form of wi-fi, such as a receiver meeting the IEEE 802.11a, b, g, or n specification), a timer for detecting data input biometrics, etc. Optional imaging device 248 can produce an image and/or a video of a user of the electronic device as well as a background near the device. The image or video data can be employed as forensic information for locating the device after it is lost or stolen, as well as providing legal evidence that a particular person was using it. The machine instructions that define the steps for implementing the present novel approach are loaded into memory 256 before being executed by processor 252, or may be firmware stored in the memory. It is also contemplated that device 240 may comprise a hardwire logic circuit, or an application specific integrated circuit (ASIC), or other type of logic device.

The user employs logic device 254 to implement the forward-secure scheme disclosed above. Processor 252 executes the machine instructions. The machine instructions stored in memory 256 are executed by the processor, causing it to carry out the logical steps, as discussed above. The results can be stored on storage 250, or on a separate storage—not shown in FIG. 7, which can be accessed by a connection to the Internet/other network 260 through network interface 242. Clearly, when logic device 254 is connected to the Internet, it can store its information data files and associated indices on a remote storage, such as OpenDHT or on some other remote storage. The user can interact with and provide input to logic device 254 using one or more optional input/output (I/O) devices 262, which may, for example, be coupled to bus 244 through a universal serial bus port or other appropriate port (not separately shown).

If instead of comprising the electronic device being tracked, logic device 254 comprises, for example, a personal computer that is being used to retrieve the information data files that were stored on the remote storage by the electronic device being tracked, the personal computer will typically include an I/O device 262 comprising a keyboard and/or mouse or other pointing device, as well display 258, which will likely comprise a monitor or other suitable device to view the information that was retrieved. Such a personal computer can thus implement post processing of the retrieved information to enable tracking the location of the electronic device over time, and for evaluating the forensic information and location information to determine where the electronic device is located. This information can be used to enable recovery of the electronic device and may also facilitate apprehension and legal prosecution of a thief who has stolen the electronic device.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A system for uploading and storing a plurality of information data files on a remote storage in association with a corresponding plurality of different indices, wherein each information data file includes location information that is indicative of a location of an electronic device, comprising:
   (a) a location module configured to be executed on the electronic device and to determine the location information for the electronic device;
   (b) a core module configured to be executed on the electronic device and to perform actions comprising:
      determining a plurality of different states over time, each state including a different seed:
      using a seed of a current state to determine an index associated with the current state, wherein the index identifies a storage location for a current information data file, and wherein the index does not reveal any other storage locations used for storing other information data files;
      storing the current information data file on the remote storage at the storage location identified by the index; and
      using the seed to determine a subsequent seed for a subsequent state; and
   (c) a retrieval module configured to be executed on a different device, wherein the retrieval module is configured to perform actions comprising:
      using an initial state to determine the plurality of different states determined by the core module;
      using the seeds of the plurality of different states to determine a plurality of different indices; and
      using indices of the plurality of different indices to retrieve information data files including information indicative of the location of the electronic device from the remote storage.

2. The system of claim 1, wherein the core module is further configured to employ the plurality of different states to determine a succession of cryptographic keys, wherein each cryptographic key that is thus determined is usable by the core module to cryptographically protect a different one of the information data files stored on the remote storage, and wherein the retrieval module is further configured to use the plurality of different states determined using the initial state to determine the cryptographic key used to cryptographically protect the desired information data file, so that the location information included in the desired information data file can be accessed.

3. The system of claim 2, wherein the cryptographic key is usable to cryptographically protect the information data file via at least one of the following functions:
   (a) encrypting the information data file, so as to maintain information included therein private; and
   (b) authenticating the location information included in the information data file, to ensure that the location information was actually determined by the location module and stored on the remote storage by the core module executed by the electronic device.

4. The system of claim 1, wherein the core module is configured to respond to at least one event detected in regard to use of the electronic device, by storing the current information data file on the remote storage, wherein the at least one event indicates that the electronic device is being used by a different person than has previously used the electronic device, the at least one event being selected from the group of events consisting of:
   (a) a detection that data entry dynamics are different for a current user of the electronic device than for a person previously using the electronic device; and
   (b) a determination that an appearance of the current user is different than that of the person who previously used the electronic device.

5. The system of claim 1, wherein the core module is further configured to use the plurality of different states to determine a succession of pseudorandom intervals between times at which the information data files are stored on the remote storage at storage locations identified by the indices.

6. The system of claim 5, wherein the retrieval module is further configured to determine each of the successive pseudorandom intervals between times at which the information data files were stored on the remote storage, to determine which of the information data files are associated with location information data stored after a given time.

7. The system of claim 2, further comprising a cache for storing location information on the electronic device between times that the information data files are stored on the remote storage, wherein the core module is further configured to use the plurality of states to determine cache states that are used to generate a succession of cryptographic cache keys for encrypting the location information temporarily stored in the cache, a new cache state being determined based on the current state each time that a information data file is stored on the remote storage, and new cache states being determined based on a previous cache state and used to generate new cache cryptographic keys, a new cache cryptographic key being generated and used for encrypting each new location information temporarily stored in the cache.

8. The system of claim 7, wherein all of the cryptographically protected location information temporarily stored in the cache is further cryptographically protected with a current cryptographic key before being stored on the remote storage.

9. The system of claim 8, wherein the retrieval module is further configured to use the initial state to determine the cryptographic cache states, to enable access of desired location information that was cryptographically protected for temporary storage in the cache before being stored on the remote storage as the desired information data file.

10. The system of claim 2, wherein the core module is further configured to use a forward-secure generator to determine the plurality of different states using the initial state, each of the succession of cryptographic keys being generated as a function of a different state in the plurality of different states, so as to prevent a current state from being used to determine any previous state, or a current cryptographic key from being used to determine any previous cryptographic key.

11. The system of claim 1, further comprising a sensor for detecting information included in the information data files, wherein the information data files each further include at least one item selected from the group of items consisting of:
  (a) a network address of the electronic device;
  (b) a traceroute of a communication path between the electronic device and other devices;
  (c) geolocation information based on roundtrip times for a signal conveyed between the electronic device and a plurality of other devices disposed at different known locations;
  (d) a location determined using global positioning satellites;
  (e) information identifying any nearby wireless data devices; and
  (f) forensic information produced by a sensor on the electronic device that may indicate one of a location and a context of the electronic device, wherein the forensic information includes any one or more of:
    (i) an image of an environment proximate to the electronic device;
    (ii) a video of the environment proximate to the electronic device; and
    (iii) audio data detected proximate to the electronic device.

12. The system of claim 2, wherein the remote storage comprises a distributed hash table, and wherein the indices that correspond to the cryptographically protected information data files are used as hash keys for storing the cryptographically protected information data files in the distributed hash table.

13. The system of claim 1, further comprising an imaging device configured to capture an image of an environment proximate to the electronic device that may show a user of the electronic device, wherein the core module is further configured to include data for the image in the current information data file stored on the remote storage.

14. The system of claim 1, wherein the core module is further configured to digitally sign each information data file that is uploaded for storage with a private key that is assigned by one or more trusted third parties as part of an anonymous group signature scheme.

15. The system of claim 14, wherein the remote storage is configured to verify that each information data file uploaded by the core module is digitally signed by the private key that is part of the anonymous group signature scheme, before storing the information data file.

16. The system of claim 1, wherein the retrieval module is configured to upload one or more software commands to storage locations identified by one or more of the determined plurality of different indices on the remote storage, so that when the core module stores a current information data file on the remote storage to the storage locations identified by those indices and detects the one or more commands stored there, the core module downloads the one or more commands and executes them on the electronic device.

17. The system of claim 16, wherein the one or more commands are at least one of encrypted, and digitally signed by the retrieval module, so that the core module decrypts the one or more commands if they are encrypted, and verifies the authenticity of the one or more commands using the digital signature if the one or more commands are digitally signed, before executing the one or more commands.

18. The system of claim 1, wherein the core module is configured to encrypt the information data files using a public key before uploading them for storage on the remote storage, the retrieval module being provided with a corresponding private key by an authorized party for use in decrypting the information data files after downloading them from the remote storage, to access the information included therein.

19. A non-transitory computer-readable memory medium on which is stored machine readable instructions for carrying out a plurality of functions to store a plurality of information data files on a remote storage in association with a corresponding plurality of different indices, wherein each information data file includes location information that is indicative of a location of an electronic device on which the machine readable instructions are being executed, the plurality of functions including:
  (a) determining location information indicative of a current location of the electronic device;
  (b) determining a plurality of different states over time, each state including a different seed;
  (c) using a seed of a current state to determine an index associated with the current state, wherein the index identifies a storage location for a current information data file, and wherein the index does not reveal any other storage locations used for storing other information data files;
  (d) storing the current information data file on the remote storage at the storage location identified by the index; and
  (e) using the seed to determine a subsequent seed for a subsequent state.

20. The non-transitory computer-readable memory medium of claim 19, wherein the plurality of functions further include determining a succession of cryptographic keys, wherein each cryptographic key that is thus determined is usable to cryptographically protect a different one of the information data files stored on the remote storage.

21. The non-transitory computer-readable memory medium of claim 20, wherein the cryptographic key is usable to cryptographically protect the information data file via at least one of the following functions:
  (a) encrypting the information data file, so as to maintain the location information included therein private; and
  (b) authenticating the location information included in the information data file, to ensure that the location information was actually determined by the location module and stored on the remote storage by the electronic device.

22. The non-transitory computer-readable memory medium of claim 19, wherein the plurality of functions further include enabling a different device to employ an initial state that was used to determine the plurality of different states, to again determine the plurality of different states, for use in determining the succession of indices that identify storage locations at which the corresponding information data files were stored on the remote storage, so that an index that identifies a storage location at which a desired information data file is stored on the remote storage can be determined, to enable retrieval of the desired information data file and access of the location information included therein.

23. The method of claim 22, further comprising:
  (a) capturing an image of a user of the electronic device; and
  (b) including data for the image in the current information data file that is stored on the remote storage.

24. A computer-implemented method for uploading and storing a plurality of information data files on a remote storage in association with a corresponding plurality of different indices, wherein each information data file includes location information that is indicative of a location of an electronic device, the method comprising:

(a) determining, by the electronic device, location information indicative of a current location of the electronic device;
(b) determining, by the electronic device, a plurality of different states over time, each state including a different seed;
(c) using, by the electronic device, a seed of a current state to determine an index associated with the current state, wherein the index identifies a storage location for a current information data file, and wherein the index does not reveal any other storage locations used for storing other information data files;
(d) storing, by the electronic device, the current information data file on the remote storage at the storage location identified by the index; and
(e) using, by the electronic device, the seed to determine a subsequent seed for a subsequent state.

25. The method of claim 24, further comprising determining a succession of cryptographic keys, each cryptographic key being determined as a function of a different state of the plurality of different states, and being used to cryptographically protect one of the information data files stored on the remote storage.

26. The method of claim 25, further comprising cryptographically protecting the information data files using the cryptographic keys by carrying out at least one of the following steps:
(a) encrypting the information data files, so as to maintain the location information included therein private; and
(b) authenticating the location information included in the information data files, to ensure that the location information was actually determined by the location module and was stored on the remote storage by the electronic device.

27. The method of claim 24, further comprising determining if the electronic device is being used by a different person than has previously used the electronic device, and in response, storing the current information data file on the remote storage, the step of determining if the electronic device is being used by a different person being selected from the group of steps consisting of:
(a) detecting whether data entry dynamics are different for a current user of the electronic device than for a person previously using the electronic device; and
(b) determining whether an appearance of the current user is different than that of the person who previously used the electronic device.

28. The method of claim 25, further comprising determining a succession of pseudorandom intervals between times at which the information data files are stored on the remote storage, the pseudorandom intervals based on the plurality of different states.

29. The method of claim 28, further comprising:
(a) storing location information in a cache on the electronic device, between successive times that information data files are stored on the remote storage;
(b) using each new state of the plurality of states to determine a new cache state;
(c) using the new cache state for determining a subsequent cache state, each subsequent cache state then being used to determine a next subsequent cache state in a succession of cache states; and
(d) using each of the succession of cache states for determining a corresponding cache cryptographic key used for cryptographically protecting the location information being then temporarily stored in the cache.

30. The method of claim 29, further comprising cryptographically protecting all of the location information that was cryptographically protected before being temporarily stored in the cache, with a current cryptographic key, to produce the current information data file that is stored on the remote storage.

31. The method of claim 30, further comprising:
(a) using an initial state, again determining the plurality of different states, and using the plurality of different states to determine the succession of indices, the succession of cryptographic keys, the plurality of cache states, and the succession of cache cryptographic keys;
(b) determining an index and a cryptographic key that was used to cryptographically protect a desired information data file that was stored on the remote storage;
(c) determining the cache cryptographic keys that were employed to encrypt the location information temporarily stored in the cache that was included in the desired information data file;
(d) retrieving the desired information data file from the remote storage using the determined index; and
(e) using the cryptographic key that was previously used to cryptographically protect the desired information data file and the cache cryptographic keys that were used to cryptographically protect the location information in the cache and included in the desired information data file to access the location information included in the desired information data file.

32. The method of claim 25, wherein determining the plurality of different states over time includes generating the plurality of different states using a forward-secure pseudorandom generator starting with an initial state, and wherein determining a succession of cryptographic keys includes determining each cryptographic key as a function of a different one of the plurality of states generated using the forward-secure pseudorandom generator, so as to prevent a current cryptographic key from being used to determine any previous cryptographic key, and to prevent a seed of a current state from being used to determine any previous seed of any previous state.

33. The method of claim 24, wherein determining the location information comprises at least one of the steps of:
(a) determining a network address of the electronic device;
(b) determining a traceroute of a communication path between the electronic device and other devices;
(c) determining geolocation information based on roundtrip times for a signal conveyed between the electronic device and a plurality of other devices disposed at different known locations;
(d) determining a location using global positioning satellites;
(e) determining information identifying any nearby wireless data devices; and
(f) evaluating forensic information produced by a sensor on the electronic device that may indicate a location of the electronic device, wherein the forensic information includes any one or more of:
  (i) an image of an environment proximate to the electronic device;
  (ii) a video of the environment proximate to the electronic device; and
  (iii) audio data detected proximate to the electronic device.

34. The method of claim 24, wherein storing the information data files includes using a distributed hash table remote storage service.

35. The method of claim 24, further comprising digitally signing each information data file that is uploaded for storage with a private key that is assigned by one or more trusted third parties as part of an anonymous group signature scheme.

36. The method of claim 35, further comprising verifying that each information data file uploaded for storage on the remote storage is digitally signed by the private key that is part of the anonymous group signature scheme before enabling the information data file to be stored on the remote storage.

37. The method of claim 24, further comprising:
(a) enabling a party that is authorized to retrieve information data files from the remote storage to determine a set of storage indices that will be used by the electronic device;
(b) uploading one or more software commands to storage locations identified by the indices on the remote storage;
(c) when the electronic device uploads an information data file to the remote storage at one of the storage locations identified by the indices, detecting the one or more commands stored there; and
(d) downloading and executing the one or more commands on the electronic device.

38. The method of claim 37, wherein the one or more commands are at least one of encrypted and digitally signed by the retrieval module, and wherein the method further comprises:
decrypting the one or more commands on the electronic device if the one or more commands are encrypted;
verifying an authenticity of the one or more commands using the digital signature if the one or more commands are digitally signed; and
executing the one or more commands on the electronic device.

39. The method of claim 24, further comprising:
(a) encrypting the information data files before uploading them for storage on the remote storage using a public key; and
(b) decrypting the information data files using a corresponding private key, after downloading them from the remote storage, to access the information included in the information data files.

40. The method of claim 24, further comprising:
determining if a current location of the electronic device corresponds to a predetermined authorized location, and if so, carrying out at least one of the steps of:
(a) suppressing upload and storage of the current information data file on the remote storage; and
(b) increasing an interval between times at which successive information data files are uploaded and stored on the remote storage compared to an interval employed when the electronic device is not at an authorized location.

41. Apparatus for storing location information for the apparatus on a remote storage in connection with a succession of indices, each index in the succession of indices being associated with a different information data file, comprising:
(a) a memory in which are stored machine executable instructions;
(b) a network interface for communicating over a network;
(c) a processor in communication with the memory and the network interface, the processor configured to execute the machine executable instructions to carry out a plurality of functions, including:
(i) determining location information indicative of a current location of the electronic device;
(ii) determining a plurality of states over time, each state including a different seed, wherein the seed for each state is used to determine an index associated with the state and to determine a subsequent seed for a subsequent state, wherein the index identifies a storage location for an information data file, and wherein the index does not reveal any other storage locations used for storing other information data files; and
(iii) communicating with the remote storage using the network interface to store, for each state of the plurality of states, an information data file on the remote storage in the storage location identified by the index associated with the state, wherein the information data file includes the location information.

42. The apparatus of claim 41, wherein the functions further include determining a succession of pseudorandom intervals between times at which the processor communicates with the remote storage to store the information data files.

43. The apparatus of claim 41, wherein the functions further include using each of the plurality of states to determine a different cryptographic key, a current cryptographic key generated using a seed of a current state being used for cryptographically protecting a current information data file before said file is stored on the remote storage.

44. The apparatus of claim 43, wherein the functions further include using each cryptographic key to cryptographically protect one of the information data files by carrying out at least one of the following functions:
(a) encrypting the information data file, so as to maintain the location information included therein private; and
(b) authenticating the location information included in the information data file, to ensure that the location information was actually determined and stored on the remote storage by the apparatus.

45. The apparatus of claim 44, wherein the memory includes a cache for temporary storage of location information between times that cryptographically protected information data files are stored on the remote storage, and wherein the functions further include:
(a) using the plurality of states to determine cache states that are used to generate successive cache cryptographic keys; and
(b) using a different cache cryptographic key for encrypting the location information each time that the location information is temporarily stored in the cache.

46. The apparatus of claim 45, wherein the functions further include cryptographically protecting all of the location information currently stored in the cache with the current cryptographic key to create a current cryptographically protected information data file that is stored on the remote storage.

47. The apparatus of claim 43, wherein the functions further include using a forward-secure generator to determine the seed for each state, wherein each seed is based on a seed of an immediately prior state, so as to prevent a current state from being used to determine any previous state, and to prevent any current cryptographic key from being used to determine any other cryptographic key.

48. The apparatus of claim 41, further comprising a sensor configured to detect information included in the information data files, and wherein the functions further include determining the location information included in the information data files corresponding to at least one item selected from the group consisting of:
(a) a network address of the electronic device;
(b) a traceroute of a communication path between the electronic device and other devices;

(c) geolocation information based on roundtrip times for a signal conveyed between the electronic device and a plurality of other devices disposed at different known locations;
(d) a location determined using global positioning satellites;
(e) information identifying any nearby wireless data devices; and
(f) forensic information produced by a sensor on the electronic device that may indicate a location of the electronic device, wherein the forensic information includes any one or more of:
  (i) an image of an environment proximate to the electronic device;
  (ii) a video of the environment proximate to the electronic device; and
  (iii) audio data detected proximate to the electronic device.

49. The apparatus of claim 41, further comprising an imaging device configured to produce an image of a user of the apparatus, wherein the functions further include including data for an image that has been captured by the imaging device with the information data stored on the remote storage for the current state.

* * * * *